US012804264B2

(12) United States Patent
Jota

(10) Patent No.: US 12,804,264 B2
(45) Date of Patent: Nov. 17, 2026

(54) CONTROL APPARATUS AND CONTROL METHOD FOR IMAGE BLUR CORRECTION

(71) Applicant: CANON KABUSHIKI KAISHA, Tokyo (JP)

(72) Inventor: Yusuke Jota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 18/812,893

(22) Filed: Aug. 22, 2024

(65) Prior Publication Data

US 2025/0080847 A1 Mar. 6, 2025

(30) Foreign Application Priority Data

Aug. 28, 2023 (JP) ................................ 2023-138003

(51) Int. Cl.
*H04N 23/68* (2023.01)

(52) U.S. Cl.
CPC ......... *H04N 23/687* (2023.01); *H04N 23/683* (2023.01)

(58) Field of Classification Search
CPC .................................................... H04N 23/687
See application file for complete search history.

(56) References Cited

U.S. PATENT DOCUMENTS

2014/0078327 A1* 3/2014 Miyasako ............ H04N 25/531 348/208.6
2014/0176755 A1* 6/2014 Narita ...................... G06T 5/80 348/222.1
2017/0214853 A1* 7/2017 Koyano ............... H04N 23/687
2017/0299944 A1* 10/2017 Matsumura .......... H04N 23/687
2021/0136290 A1* 5/2021 Ikeda ................... H04N 23/687
2023/0007177 A1* 1/2023 Ishibiki ................ H04N 23/663
2024/0073526 A1* 2/2024 Shibata ................ H04N 23/667
2024/0073527 A1* 2/2024 Shibata ................ H04N 23/687

FOREIGN PATENT DOCUMENTS

JP 6410431 B2 10/2018

* cited by examiner

*Primary Examiner* — Cynthia Calderon
(74) *Attorney, Agent, or Firm* — Canon U.S.A., Inc. IP Division

(57) ABSTRACT

A control apparatus controls blur correction by a first correction unit configured to move an element included in a system, a second correction unit configured to move a sensor in a direction intersecting an axis, and a third correction unit configured to correct, by processing, a tilt component of blur occurring from shake of an imaging apparatus in an image. The control apparatus controls the first and second correction units using at least a first scheme and a second scheme. The third control unit is controlled so that strength of the blur correction of the tilt component by the third correction unit is higher when the first scheme is used for control than when the second scheme is used for control.

18 Claims, 8 Drawing Sheets

FIRST COORDINATION SCHEME

| | |
|---|---|
| RATIO SPECIFICATION | OIS : IBIS : EIS = CONSTANT RATIO |
| RATIO DETERMINANT | DETERMINE FROM “MAXIMUM MOVABLE RANGES OF OIS, IBIS, AND EIS” |
| EXAMPLE OF RATIO | OIS : IBIS : EIS = 35% : 35% : 30% |

FIG.4

SECOND COORDINATION SCHEME

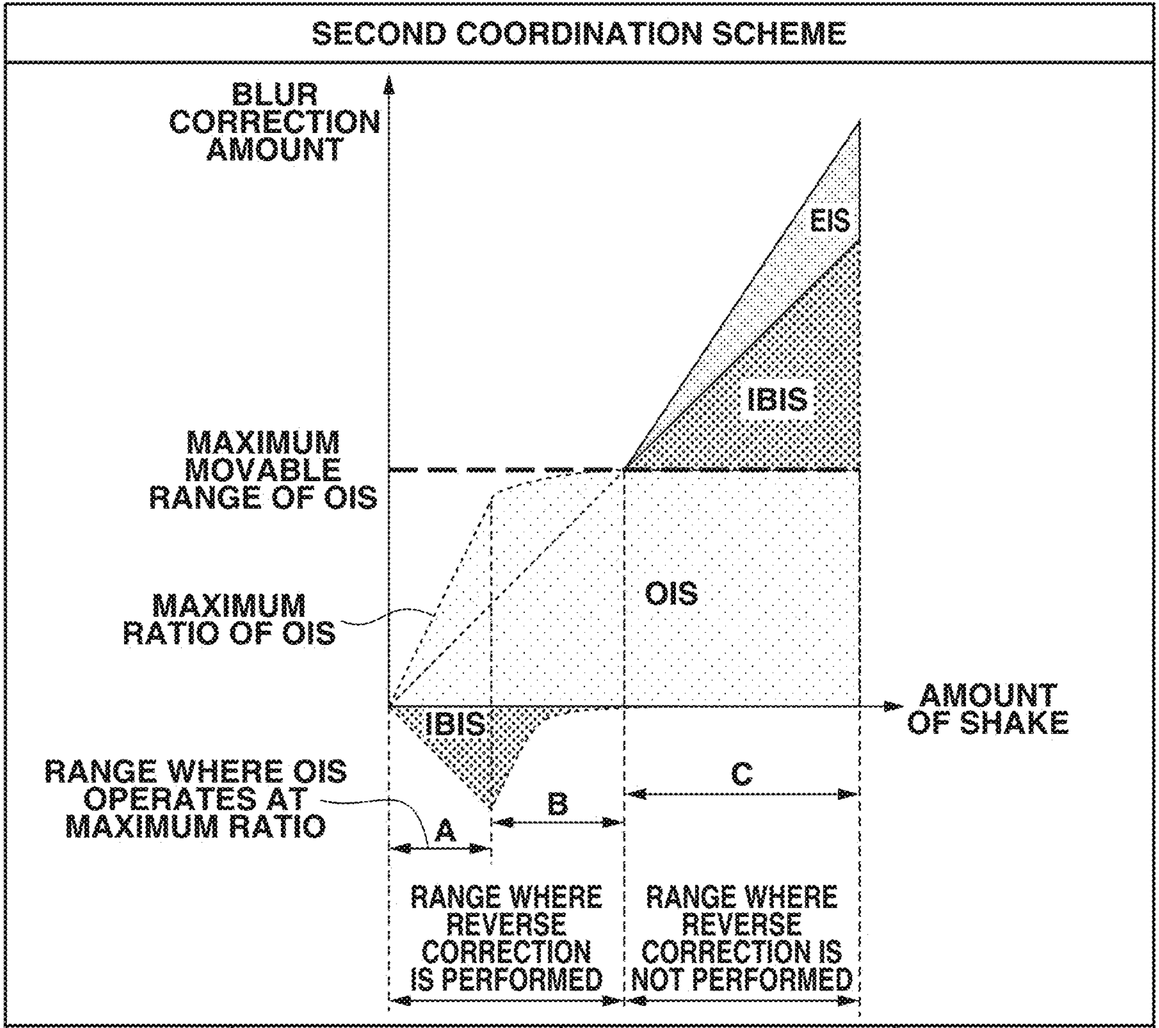

| INTERVAL | A | B | C |
|---|---|---|---|
| RATIO SPECIFICATION | OIS : IBIS = OVERCORRECTION : REVERSE CORRECTION | OIS : IBIS = TRANSITIONAL RATIO | OIS : IBIS : EIS = VARIABLE RATIO |
| RATIO DETERMINANT | DETERMINED FROM “MAXIMUM RATIO OF OIS”, “MAXIMUM MOVABLE RANGE OF OIS”, AND “RANGE WHERE OIS OPERATES AT MAXIMUM RATIO” | | |
| EXAMPLE OF RATIO | OIS : IBIS : EIS = 200% : -100% | OIS : IBIS = 200% : -100% ↓ OIS : IBIS = 100% : 0% | OIS : IBIS : EIS = α% : β% : γ% |

CONTROL APPARATUS AND CONTROL METHOD FOR IMAGE BLUR CORRECTION

BACKGROUND

Technical Field

The aspect of the embodiments relates to a control apparatus for image blur correction used in an imaging apparatus, the imaging apparatus including the control apparatus, and a control method.

Description of the Related Art

In recent years, many imaging apparatuses such as digital cameras and video cameras have been equipped with an image blur correction function of correcting shake acting on the imaging apparatuses. The image blur correction function enables capturing images with more favorable image quality.

Among image blur correction mechanisms for such an imaging apparatus is one that reduces image blur by shifting an image blur correction lens with respect to the optical axis of the imaging optical system (hereinafter, referred to as optical image stabilization [OIS]). Moreover, there is another that reduces image blur by shifting an image sensor with respect to the optical axis of the imaging optical system (hereinafter, referred to as in-body image stabilization [IBIS]).

Japanese Patent No. 6410431 discusses widening the correctable blur angle (hereinafter, referred to as image blur correction angle) by simultaneously driving the two image blur correction mechanisms.

However, the amount of relative movement between an object image and the image sensor (amount of blur of the object image on the image) caused by the movement of the imaging apparatus can vary with image height. The optimum image blur correction amount thus differs depending on the image height. For example, image blur in a central area with low image height can be successfully corrected while image blur in peripheral areas with high image height remains noticeable.

The method discussed in Japanese Patent No. 6410431 does not take into consideration any countermeasures against the foregoing issue.

SUMMARY

According to an aspect of the embodiments, a control apparatus for controlling blur correction by a first correction unit configured to change a direction of an axis of a system by moving an element included in the system, a second correction unit configured to move a sensor in a direction intersecting the axis, and a third correction unit configured to correct, by processing, a tilt component of blur occurring from shake of an imaging apparatus in an image generated by processing a signal output from the senor, the sensor being configured to capture an object image formed by light transmitted through the system, the control apparatus comprising one or more processors that execute a program stored in a memory and thereby function as a determination unit configured to determine strength of the blur correction of the tilt component by the third correction unit, a calculation unit configured to calculate a correction amount of the third correction unit based on the determined strength of the blur correction and an amount of shake of the imaging apparatus, and a control unit configured to control the first correction unit and the second correction unit using a plurality of schemes including at least a first scheme and a second scheme. The determination unit is configured to, in a case where the control unit controls the first and second correction units using the first scheme, determine a first correction strength as the strength of the blur correction, and in a case where the control unit controls the first and second correction units using the second scheme, determine a second correction strength higher than the first correction strength as the strength of the blur correction.

Further features of the disclosure will become apparent from the following description of exemplary embodiments with reference to the attached drawings.

BRIEF DESCRIPTION OF THE DRAWINGS

FIG. 4 is a diagram for describing a second coordination scheme.

DESCRIPTION OF THE EMBODIMENTS

Figure 1:
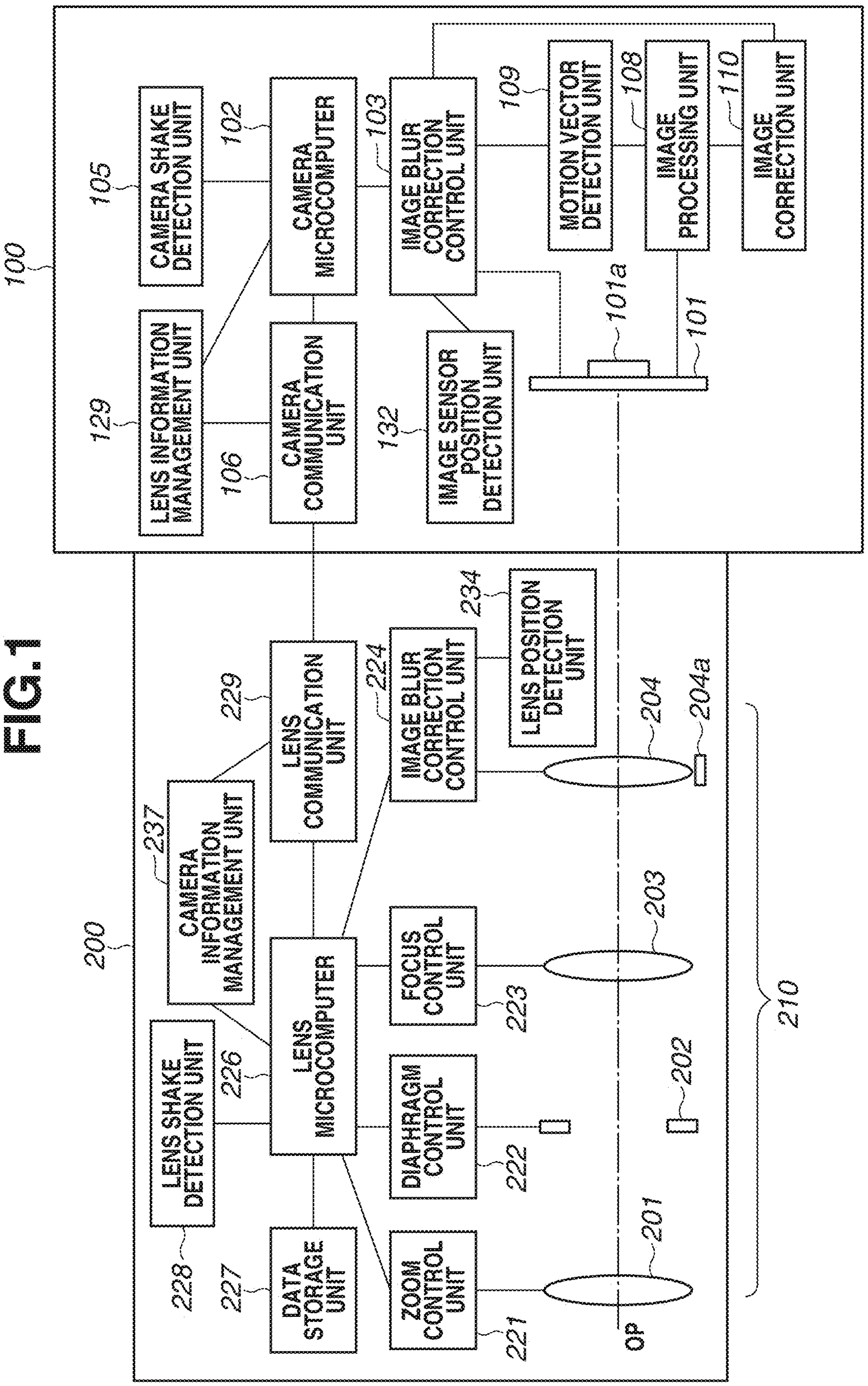
FIG. 1 is a block diagram illustrating a schematic configuration of an imaging system according to an exemplary embodiment.

An exemplary embodiment will be described in detail below with reference to the attached drawings. The following exemplary embodiment is not intended to limit the disclosure set forth in the claims. While a plurality of features is described in the exemplary embodiment, all such features are not necessarily essential to the disclosure, and more than one feature may be freely combined. In the attached drawings, the same or similar components are denoted by the same reference numerals, and redundant descriptions will be omitted.

FIG. 1 is a block diagram illustrating a schematic configuration of an imaging system according to a first exemplary embodiment. The imaging system includes a camera main body 100 and a lens apparatus (hereinafter, referred to as an "interchangeable lens") 200 detachably attachable to the camera main body 100. The camera main boy 100 may be a still camera or a video camera. In the present exemplary embodiment, blur correction in the imaging system (lens interchangeable camera) where the interchangeable lens is detachably mounted on the camera main body will be described.

The components of the camera main body 100 will initially be described. An image sensor 101 is an image sensor such as a complementary metal-oxide-semiconductor (CMOS) image sensor. The image sensor 101 photoelectrically converts an object image formed by light transmitted through an imaging optical system 210 of the interchangeable lens 200 and thereby captures the object image. The image sensor 101 is configured to be movable in directions intersecting an optical axis OP of the imaging optical system 210 by a shift mechanism 101*a*. The image sensor 101 and the shift mechanism 101*a* function as an image blur correction unit (second image blur correction unit). For example, the image sensor 101 can be shifted within a plane orthogonal to the optical axis OP and rotated about the optical axis OP within the plane orthogonal to the optical axis OP. The following description deals mainly with the case of shifting the image sensor 101. The shift mechanism 101*a* includes an actuator and can shift the image sensor 101 based on control from an image blur correction control unit 103 of the camera main body 100. An output signal (hereinafter, imaging signal) from the image sensor 101 is input to an image processing unit 108.

The image processing unit 108 performs various types of image processing on the input imaging signal to generate image data. The image data generated by the image processing unit 108 is output to a motion vector detection unit 109 and an image correction unit 110.

The motion vector detection unit 109 detects motion information about a feature point in the image data as a motion vector by using a plurality of pieces of image data (plurality of frames of image data) at different imaging timings, generated by the image processing unit 108 when the image sensor 101 continuously captures images. The motion vector may be detected using any conventional method, such as a correlation method and a block matching method. A description of the detection method will be omitted.

The image correction unit 110 electronically performs image blur correction (hereinafter, may be referred to as electronic image stabilization [EIS]) by performing image processing based on information about an image blur correction amount output from the image blur correction control unit 103 to be described below. Details of the image shape correction method will be described below. Blur-corrected image data generated by the image correction unit 110 is displayed on a not-illustrated monitor or recorded on a not-illustrated recording medium.

A camera shake detection unit 105 includes an inertial sensor such as an angular velocity sensor and an acceleration sensor, and detects the shake of the camera main body 100 (hereinafter, referred to as "camera shake") caused by the user's hand movement. The camera shake detection unit 105 then outputs a camera shake detection signal that is the detection result to the image blur correction control unit 103 via a camera microcomputer 102. The present exemplary embodiment deals with a configuration where the camera shake detection unit 105 is an angular velocity sensor and outputs an angular velocity signal as the camera shake detection signal.

The camera microcomputer 102 controls processing of the entire camera main body 100. The camera microcomputer 102 can communicate with a lens microcomputer 226 via a camera communication unit 106 and a lens communication unit 229 in the interchangeable lens 200.

The camera communication unit 106 includes electrical contacts, and performs communication between the interchangeable lens 200 and the camera main body 100 when connected to electrical contacts included in the lens communication unit 229 of the attached interchangeable lens 200.

A lens information management unit 129 stores and manages various types of information about the interchangeable lens 200, obtained through communication with the interchangeable lens 200 via the camera communication unit 106. The various types of information (lens information) include optical characteristic information about an image blur correction lens included in the interchangeable lens 200, correction position information about the image blur correction lens, and information about a movable range (upper limit value of a driving amount).

The image blur correction control unit 103 of the camera main body 100 has a function as a control unit that controls in-body image stabilization (IBIS) by controlling the movement of the image sensor 101. The image blur correction control unit 103 also has a function as a control unit that controls EIS by controlling the electronic image blur correction by the image correction unit 110. The image blur correction control unit 103 calculates the shift amount (target value of the image blur correction amount) of the image sensor 101 and the electronical image blur correction amount of the image correction unit 110 for reducing the image blur due to the camera shake based on the camera shake detection signal detected by the camera shake detection unit 105. The image blur correction control unit 103 of the camera main body 100 according to the present exemplary embodiment also functions as a control unit that controls optical image stabilization (OIS) by outputting an OIS correction ratio to the interchangeable lens 200. The OIS correction ratio will be described below.

The image blur correction control unit 103 drives the image sensor 101 to shift by the foregoing shift amount by controlling the actuator included in the shift mechanism 101*a* based on the calculated shift amount of the image sensor 101. The object image can thereby be moved on the image plane (sensor plane) of the image sensor 101. This enables image blur correction (IBIS) by shifting the image sensor 101.

The image blur correction control unit 103 also controls EIS by outputting the calculated image blur correction amount of the image correction unit 110 to the image correction unit 110. The image correction unit 110 can perform the image blur correction (EIS) through electronic image correction by performing projective transformation-based geometric deformation based on the image blur correction amount output from the image blur correction control unit 103. If an EIS cropping range smaller than the readout range of the image sensor 101 is set, the difference between the readout range of the image sensor 101 and the cropping range provides surplus pixels, or a range where EIS correction can be made (EIS-correctable range). In the present exemplary embodiment, EIS is capable of blur correction on translational, rotational, and tilt components. While the present exemplary embodiment deals with projective transformation, other transformation methods such as affine transformation may also be used.

The image sensor position detection unit 132 is a position detection sensor such as a Hall sensor. The image sensor position detection unit 132 detects the position of the image sensor 101 and outputs the position to the image blur correction control unit 103.

The components of the interchangeable lens 200 will be described. The imaging optical system 210 includes a variable power lens 201, a diaphragm 202, a focus lens 203, and an image blur correction lens 204 that is an optical element capable of changing the forming position of an object image.

A zoom control unit 221 can detect the position of the variable power lens 201 (hereinafter, referred to as a "zoom position"), and performs zooming by driving the variable power lens 201 based on a zoom drive command from the camera microcomputer 102. The information about the zoom position is transmitted to the camera main body 100 via the lens microcomputer 226 and the lens communication unit 229. The zoom position to be transmitted may be information about the position of the variable power lens 201 or information about a focal length corresponding to the zoom position.

A diaphragm control unit 222 can detect an aperture diameter of the diaphragm 202 (hereinafter, referred to as a "diaphragm position"), and performs light amount adjustment by driving the diaphragm 202 based on a diaphragm drive command from the camera microcomputer 102. The diaphragm control unit 222 may continuously detect and control the diaphragm position, or discontinuously detect and control the diaphragm position like open, 2-step (intermediate), and 1-step (minimum). The diaphragm position may be detected by using the driving amount of a driving mechanism that drives the diaphragm 202. The information about the diaphragm position is transmitted to the camera main body 100 via the lens microcomputer 226 and the lens communication unit 229.

A focus control unit 223 can detect the position of the focus lens 203 (hereinafter, referred to as a "focus position"), and performs focus adjustment by driving the focus lens 203 based on a focus drive command from the camera microcomputer 102. The information about the focus position is transmitted to the camera main body 100 via the lens microcomputer 226 and the lens communication unit 229.

The image blur correction lens 204 is configured to be capable of being shifted by a shift mechanism 204*a* in directions including a direction component orthogonal to the optical axis. The image blur correction lens 204 and the shift mechanism 204*a* function as an image blur correction unit (first image blur correction unit). More specifically, the image blur correction lens 204 is configured to be capable of being shifted within a plane orthogonal to the optical axis and rotated with a point on the optical axis as the rotation center. The following description deals mainly with the case of shifting the image blur correction lens 204. Shifting the image blur correction lens 204 changes the direction of the optical axis of the imaging optical system 210 and moves the position of the object image formed on the image plane of the image sensor 101, whereby image blur correction can be made.

The shift mechanism 204*a* includes an actuator, and can shift the image blur correction lens 204 based on control from an image blur correction control unit 224 of the interchangeable lens 200.

A lens shake detection unit 228 includes an inertial sensor such as an angular velocity sensor and an acceleration sensor. The lens shake detection unit 228 detects the shake of the interchangeable lens 200 (hereinafter, referred to as "lens shake") caused by the user's hand movement, and outputs a lens shake detection signal indicating the lens shake to the image blur correction control unit 224 via the lens microcomputer 226. When the interchangeable lens 200 is mounted on the camera main body 100, the lens shake and the camera shake are substantially the same. The shake detected by the lens shake detection unit 228 is therefore also referred to as camera shake. The present exemplary embodiment deals with a configuration where the lens shake detection unit 228 is an angular velocity sensor and outputs angular velocity as the lens shake detection signal.

The image blur correction control unit 224 of the interchangeable lens 200 has a function as a control unit that controls OIS by controlling the movement of the image blur correction lens 204. The image blur correction control unit 224 calculates the shift amount of the image blur correction lens 204 for reducing (correcting) the image blur due to the lens shake based on the lens shake detection signal detected by the lens shake detection unit 228. The actuator included in the shift mechanism 204*a* is then controlled based on the shift amount, whereby the image blur correction lens 204 is driven to shift by the calculated shift amount. This enables image blur correction by shifting the image blur correction lens 204.

The foregoing image blur correction by shifting the image sensor 101 (IBIS) and the lens image blur correction by shifting the image blur correction lens 204 (OIS) are typically referred to as optical image stabilization.

The foregoing image blur correction through the electronic image correction (EIS) by the image correction unit 110 is typically referred to as electronic image stabilization.

In the present exemplary embodiment, whether to perform the optical image stabilization (OIS and IBIS) can be set for each of the image blur correction by shifting the image sensor 101 and the lens image blur correction independently. Whether to perform the optical image stabilization may be set by the camera microcomputer 102 based on user instructions, or automatically based on various types of information such as a mode of the camera main body 100. In the present exemplary embodiment, whether to perform the electronic image stabilization can be set in a case where the optical image stabilization is set to be performed. However, the electronic image stabilization may also be set to be performed even in a case where the optical image stabilization is set to not be performed. Whether to perform the electronic image stabilization may be set by the camera microcomputer 102 based on user instructions, or automatically based on various types of information such as a mode of the camera main body 100.

A lens position detection unit 234 is a position detection sensor such as a Hall sensor. The lens position detection unit 234 detects the position of the image blur correction lens 204 and outputs the position to the image blur correction control unit 103.

The lens microcomputer 226 controls processing of the entire interchangeable lens 200. The lens microcomputer 226 can communicate with the camera microcomputer 102 via the lens communication unit 229 and the camera communication unit 106 in the camera main body 100. The lens microcomputer 226 also has a function as a transmission control unit that reads information stored in a data storage unit 227, such as image circle information, and transmits the image circle information and other information to the camera main body 100.

The lens communication unit 229 includes electrical contacts, and performs communication between the interchangeable lens 200 and the camera main body 100 when connected to the electrical contacts included in the camera communication unit 106 of the camera main body 100 on which the interchangeable lens 200 is mounted.

A camera information management unit 237 stores and manages various types of information about the camera main body 100, obtained through communication with the camera main body 100 via the lens communication unit 229. The various types of information (camera information) include camera setting information, position information about the image sensor 101, and information about a movable range.

The data storage unit 227 is a nonvolatile storage unit, and stores optical information such as the zoom range (movable range of the focal length) and the focus range (range of distances capable of focusing) of the imaging optical system 210, and the variable range of the diaphragm value.

Figure 2:
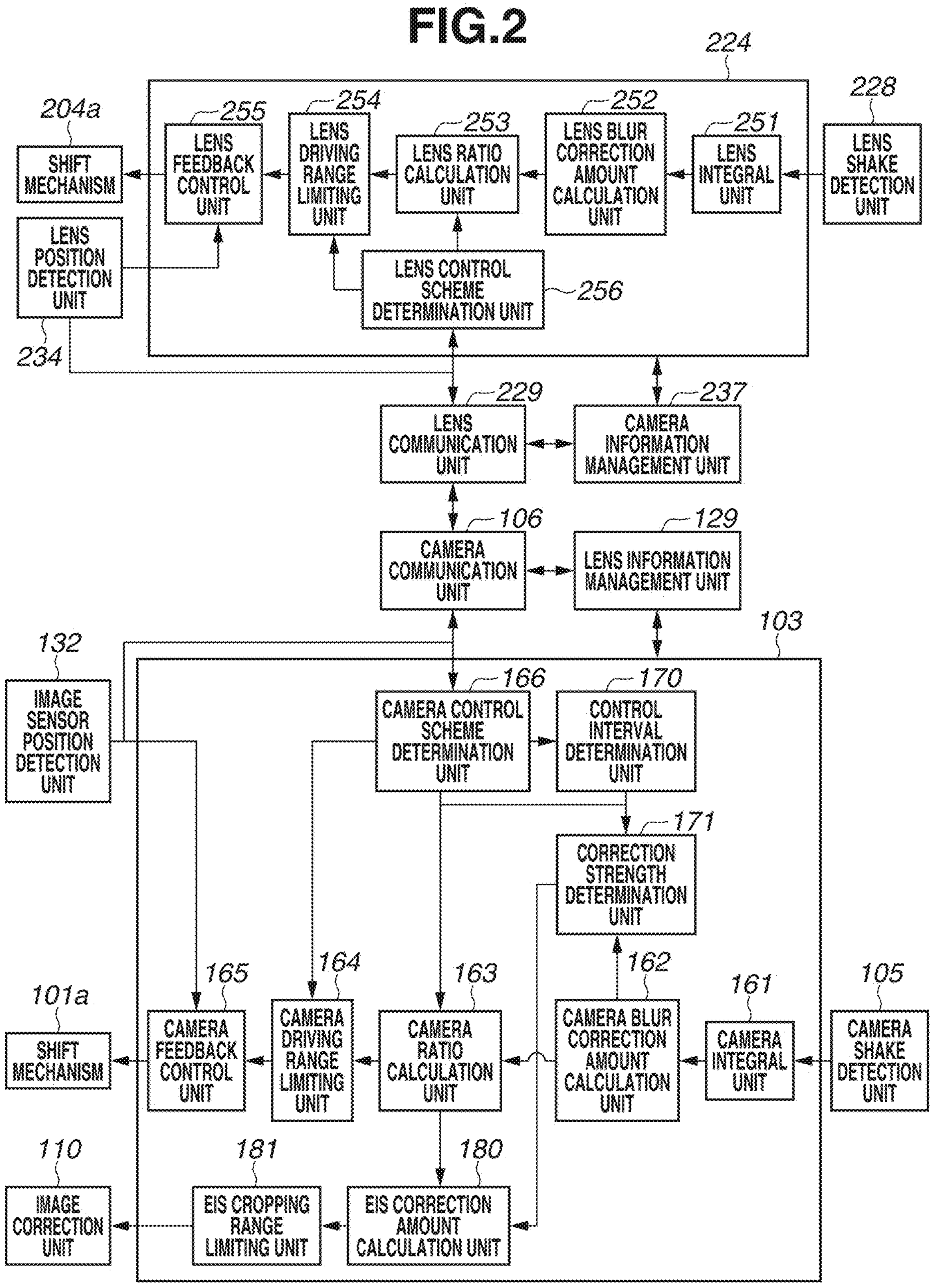
FIG. 2 is a block diagram illustrating a schematic configuration of image blur correction control systems of a camera main body and an interchangeable lens according to the exemplary embodiment.

FIG. 2 is a block diagram illustrating a detailed configuration of the image blur correction control unit 103 of the camera main body 100 and the image blur correction control unit 224 of the interchangeable lens 200. The configuration of the image blur correction control unit 103 of the camera main body 100 will initially be described.

The image blur correction control unit 103 of the camera main body 100 receives input of the detection result of the shake angular velocity as the camera shake detection signal from the camera shake detection unit 105. A camera integral unit 161 in the image blur correction control unit 103 of the camera main body 100 converts the input shake angular velocity into a shake angle by performing integral processing on the shake angular velocity. In the present exemplary embodiment, a pseudo-integral low-pass filter (hereinafter, referred to as an integral low-pass filter [LPF]) is used as the camera integral unit 161.

A camera blur correction amount calculation unit 162 calculates a correction amount for cancelling the shake angle, taking into consideration the frequency band of the converted shake angle and the drivable range of the camera main body 100. A specific example of the processing is band-pass filter processing for extracting a specific frequency band targeted for the blur correction from the input shake angle signal.

A camera control scheme determination unit 166 determines in which scheme to perform coordinated control for making image blur correction in a shared manner between the camera main body 100 (IBIS and EIS) and the interchangeable lens 200 (OIS), a first coordination scheme or a second coordination scheme. In the present exemplary embodiment, the first coordination scheme is selected if at least one of the camera main body 100 and the interchangeable lens 200 does not support the second coordination scheme. The second coordination scheme is selected if both support the second coordination scheme.

Now, the first and second coordination schemes will be described with reference to FIGS. 3 and 4.

Figure 3:
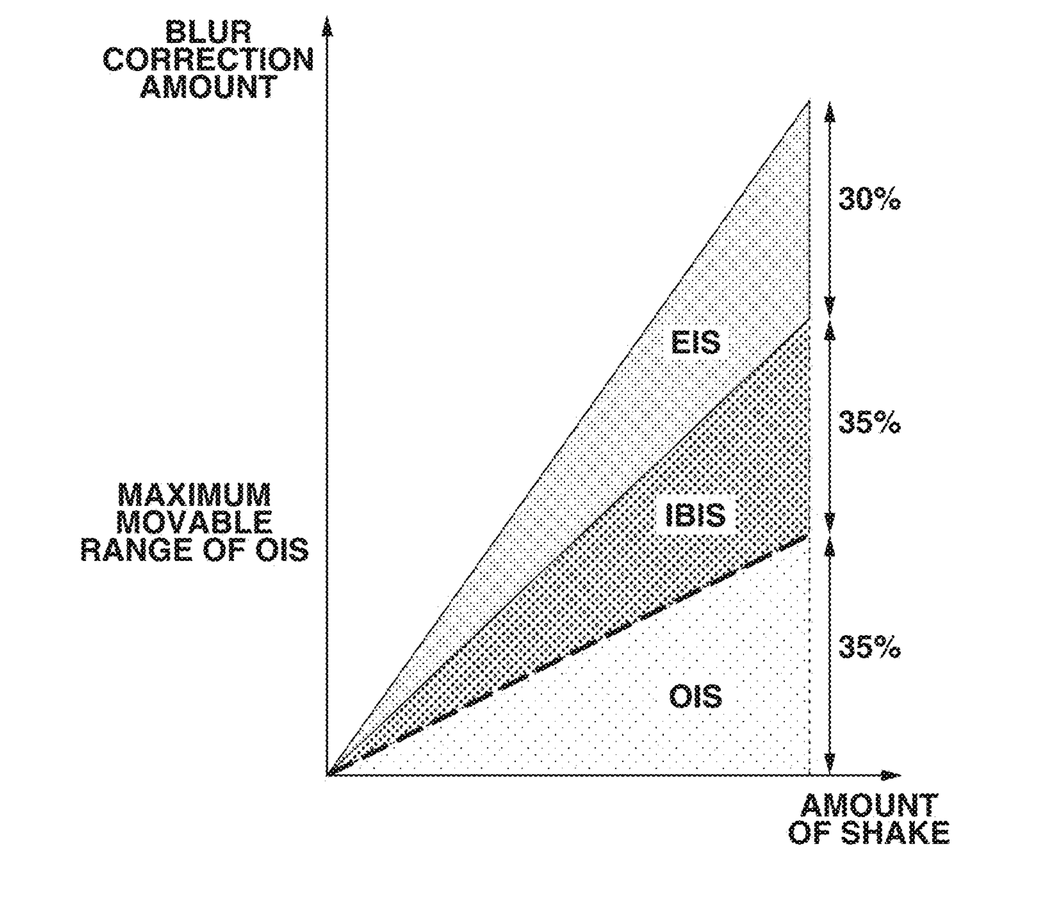
FIG. 3 is a diagram for describing a first coordination scheme.

FIG. 3 is a diagram for describing the first coordination scheme. FIG. 4 is a diagram for describing the second coordination scheme.

The horizontal axes of the graphs in FIGS. 3 and 4 indicate the amount of shake detected by the camera shake detection unit 105. The vertical axes indicate a total blur correction amount (may be referred to as a first correction amount) to be corrected by OIS, IBIS, and EIS. In performing blur correction, in one embodiment, the amount of shake and the blur correction amount be the same, since as much correction as the detected amount of shake can be made to eliminate remaining blur.

The first coordination scheme will be described with reference to FIG. 3. In the first coordination scheme, the ratio between OIS, IBIS, and EIS is constant regardless of the amount of shake. The blur correction amount that OIS is in charge of, the blur correction amount that IBIS is in charge of, and the blur correction amount that EIS is in charge of therefore all increase as the amount of shake increases, until the end (upper limit value) of the range correctable by OIS, IBIS, and EIS is reached. In the present exemplary embodiment, the ratio is determined from the magnitudes of the correctable ranges of OIS, IBIS, and EIS. As employed herein, a correctable range refers to the distance up to which the object image and the image plane of the image sensor 101 can be relatively moved by driving the image blur correction lens 204 or the image sensor 101. For EIS, the correctable range refers to the range where a correction can be made by geometrically deforming an image within the surplus pixels that are the difference between the readout range of the image sensor 101 and the cropping range. FIG. 3 illustrates a case where the ratio between the correctable ranges of OIS, IBIS, and EIS is OIS:IBIS:EIS=35%:35%:30% as an example. In such a case, the correction ratio between OIS, IBIS, and EIS is maintained at OIS:IBIS:EIS=35%:35%:30% regardless of the amount of shake.

Here, the direction of relative movement between the object image and the image plane of the image sensor 101 caused by OIS, the direction of relative movement between the object image and the image plane of the image sensor 101 caused by IBIS, and the direction of relative movement between the object image and the image plane (cropping position of the image) caused by EIS are the same. The image blur caused by hand movement is thus corrected by OIS, IBIS, and EIS in a shared manner. Suppose, for example, that a correction lens that moves an object image upward as the correction lens moves upward is used. In such a case, at the timing when an upward hand movement occurs, OIS moves the correction lens downward to move the object image downward with respect to the image plane of the image sensor 101. Here, IBIS moves the image sensor 101 upward and EIS changes the cropping position on the image upward to move the object image downward with respect to the image plane of the image sensor 101 (in other words, move the image plane upward with respect to the object image). Such a scheme where OIS, IBIS, and EIS operate to cause relative movements in the same direction at the same ratio regardless of the amount of shake is referred to as the first coordination scheme. Here, the blur correction amount that OIS is in charge of, the blur correction amount that IBIS is in charge of, and the blur correction amount that EIS is in charge of do not each exceed the actually detected amount of shake. In the case of making corrections by OIS, IBIS, and EIS in a shared manner, the blur correction amount that EIS is in charge of is one for a translational component. Since IBIS and EIS are capable of blur correction of a rotational component while OIS is not, the blur correction of the rotational component may be performed by IBIS and EIS in a shared manner.

In FIG. 3, the correction ratio of EIS is described be determined based on the movable range as with OIS and IBIS. However, the first coordination scheme is not limited thereto. Other schemes may be employed as long as the direction of the relative movement between the object image and the image plane of the image sensor 101 caused by OIS, the direction of the relative movement between the object image and the image plane of the image sensor 101 caused by IBIS, and the direction of the relative movement between the object image and the image plane of the image sensor 101 caused by EIS are the same. For example, the correction ratio between OIS and IBIS may be determined based on the ratio of the correctable ranges, and EIS may correct the remainder not fully corrected by OIS and IBIS. If EIS corrects translational blur by projective transformation, unlike OIS or IBIS, image blur occurring during the acquisition of an image is unable to be corrected, and the image blur is corrected by adjusting the cropping position between frames. By using OIS and IBIS by priority over EIS, image blur occurring during the acquisition of an image can therefore be corrected more effectively than with the scheme illustrated in FIG. 3.

The second coordination scheme will be described with reference to FIG. 4. According to the second coordination scheme, in intervals A and B, the moving amount of the image blur correction lens 204 to correct the amount of shake occurring is less than or equal to the length of the movable range of the image blur correction lens 204. In the intervals A and B, OIS drives the image blur correction lens 204 by an excessive blur correction amount exceeding the amount to correct the amount of shake occurring. As employed herein, the movable range of the image blur correction lens 204 refers to the length from the reference position to the movable end of OIS. In other words, the intervals A and B are where the amount of shake occurring can be corrected by OIS alone. As employed in the present exemplary embodiment and this specification, controlling driving with the blur correction amount exceeding the amount to correct the amount of shake occurring in such a manner will be referred to as overcorrection control. In the meantime, reverse correction control is performed by IBIS to cancel the excessive correction amount, i.e., the excess of the blur correction amount over the amount to correct the blur occurring. Here, the directions of relative movement for OIS and IBIS to cause between the object image and the image plane of the image sensor 101 are opposite to each other. As employed herein, such a scheme where overcorrection is made by OIS and the excess of the correction is cancelled by IBIS will be referred to a first control scheme.

Now, if the blur correction amount to correct the amount of shake occurring exceeds the length of the movable range of OIS and the blur occurring is unable to be corrected by OIS alone (interval C), the amount of blur not correctable by OIS is corrected by IBIS and EIS in a shared manner. Here, the moving direction of IBIS and the image cropping direction of EIS are such that the relative movement between the object image and the image sensor 101 due to the shake occurring decreases. The directions of relative movement for OIS, IBIS, and EIS to cause between the object image and the image plane of the image sensor 101 are the same.

As employed herein, such a scheme for exercising control in the presence of blur too large to be fully corrected by the first control scheme so that the directions of relative movement for OIS, IBIS, and EIS to cause between the object image and the image plane of the image sensor 101 are the same will be referred to as a second control scheme. If an amount of shake exceeding the amount corresponding to the border between the intervals B and C is detected during the control in the first control scheme (i.e., if the amount of shake increases from less than or equal to a predetermined value to greater than the predetermined value), the first control scheme with reverse correction is switched to the second control scheme without reverse correction. On the other hand, if an amount of shake less than the amount corresponding to the border between the intervals B and C is detected during the control in the second control scheme, the second control scheme where OIS and IBIS corrections are made in the same direction is switched to the first control scheme with reverse correction.

The control in each interval will be described in detail. The interval A is an interval where OIS performs overcorrection control and IBIS performs reverse correction control, and where OIS operates at the maximum ratio in particular. In the example illustrated in FIG. 4, the maximum ratio is 200%, and the correction amount is twice the amount to correct the image blur due to the hand movement occurring. Since the OIS overcorrection at this rate would cause image blur, the correction ratio of IBIS is set to −100% so that the total correction ratio of OIS and IBIS is 100%. The correction ratio of −100% refers to driving with a blur correction amount that causes the same amount of blur in the same direction as with the image blur due to the hand movement occurring. In other words, the correction ratio of −100% refers to driving with the blur correction amount that doubles the image blur due to the hand movement.

The interval B is an interval from the end of the interval A to where the blur correction amount to correct the amount of blur occurring exceeds the length of the movable range of OIS. The interval B can be said to be an interval where the correction ratio of OIS and the reverse correction amount by IBIS decrease gradually, or an interval where the absolute values of the correction ratio of OIS and the correction ratio of IBIS decrease gradually. In the example of FIG. 4, the correction ratio of OIS at the border between the intervals A and B is 200%, and the correction ratio of IBIS is −100%. The absolute values of the correction ratios are controlled to decrease monotonically from the border between the intervals A and B to the border between the intervals B and C so that the correction ratio of OIS transitions from 200% to 100% and that of IBIS from −100% to 0%. Here, just the right amount of blur can be corrected by controlling the absolute values so that the total correction ratio of OIS and IBIS is 100%. The intervals A and B are where the first control scheme is performed.

In the interval C, OIS is unable to provide further blur correction, and the remaining blur is corrected by IBIS and EIS in a shared manner. In this period, the blur correction amount by OIS remains constant, and in one embodiment, only the blur correction amounts by IBIS and EIS increase. In the interval C, the correction ratio of OIS, IBIS, and EIS is therefore not constant. As the amount of shake increases, the correction ratio (B) of IBIS and the correction ratio (y) of EIS increase and the correction ratio (a) of OIS decreases. Even in this interval, just the right amount of blur can be corrected by controlling the total correction ratio of OIS, IBIS, and EIS to be 100%.

FIG. 4 illustrates an example where the correction ratio of IBIS and EIS in the interval C is determined based on the ratio of the maximum movable ranges as with the first coordination scheme. However, the correction ratio of IBIS and EIS in this interval does not need to be based on the ratio of the maximum movable ranges like the first coordination scheme. As described above, if translational blur correction is performed by EIS using geometric deformation, image blur during the acquisition of an image is unable to be corrected. Therefore, for example, in the interval C, a scheme such that IBIS first compensates for the deficiency of OIS and then EIS corrects the deficiency of OIS and IBIS may be employed.

As compared to the first coordination scheme, the second coordination scheme illustrated in FIG. 4 can reduce image blur in the peripheral areas of the image where image height is high. In capturing a moving image walking with the camera main body 100 held in hand, the camera main body 100 shakes significantly due to impact such as the photographer's steps. Here, image blur due to the shake of the camera main body 100 is corrected by OIS, IBIS, and EIS. However, since the optimum image blur correction amount can differ between the central area of the image where image height is low and the peripheral areas of the image where image height is high, the image blur in the peripheral areas of the image can become noticeable if correction optimum for the central area of the image is applied using the first coordination scheme. This is particularly pronounced in capturing a wide-angle image or capturing a moving image.

Such image blur in the peripheral areas of the image can be reduced by performing the first control in the second coordination scheme.

Which of the first and second coordination schemes described with reference to FIGS. 3 and 4 to use in controlling OIS, IBIS, and EIS is determined by the camera control scheme determination unit 166. Note that there may be three or more coordination schemes, and the camera control scheme determination unit 166 may select one from the three or more coordination schemes.

Return to the description of the image blur correction control unit 103 of the camera main body 100 with reference to FIG. 2. A camera ratio calculation unit 163 obtains a camera correction ratio that the camera main body 100 (IBIS+EIS) is in charge of, with the total blur correction amount by the camera main body 100 (IBIS+EIS) and the interchangeable lens 200 as 100%. The camera ratio calculation unit 163 then calculates a second correction amount by multiplying the first correction amount calculated by the camera blur correction amount calculation unit 162 by the camera correction ratio. The camera correction ratio is obtained based on the coordination control scheme (first coordination scheme or second coordination scheme). If the second coordination scheme is used, the camera ratio calculation unit 163 further obtains the camera correction ratio based on data indicating the relationship between the amount of shake and the ratio, like the graph of FIG. 4, and the amount of shake detected. Since the first correction amount corresponds to the total amount of correction to be made by the camera main body 100 (IBIS and EIS) and the interchangeable lens 200 (OIS), the second correction amount of the blur correction to be made by the camera main body 100 is calculated through the multiplication of the camera correction ratio that the camera main body 100 is in charge of.

The camera ratio calculation unit 163 further obtains an IBIS correction ratio that IBIS is in charge of with the total blur correction amount by IBIS and EIS as 100%, and calculates a third correction amount that is an IBIS correction amount by multiplying the second correction amount by the IBIS correction ratio. The IBIS correction ratio is obtained based on the coordination control scheme (first coordination scheme or second coordination scheme). If the second coordination scheme is used, the camera ratio calculation unit 163 obtains the IBIS correction ratio based further on the data indicating the relationship between the amount of shake and the ratio, like the graph of FIG. 4, and the amount of shake detected. Since the second correction amount corresponds to the total amount of correction to be made by the camera main body 100 (IBIS and EIS), the third correction amount of the blur correction IBIS is calculated by multiplying the second correction amount by the IBIS correction ratio that IBIS is in charge of. The EIS correction ratio that EIS is in charge of is calculated by subtracting the IBIS correction ratio from 100%. The camera ratio calculation unit 163 calculates a fourth correction amount that is an EIS correction amount by multiplying the second correction amount by the EIS correction ratio. Since the second correction amount corresponds to the total amount of correction to be made by the camera main body 100 (IBIS and EIS), the fourth correction amount of the blur correction to be made by EIS is calculated through the multiplication of the EIS correction ratio that EIS is in charge of.

While the second correction amount that is the correction amount by the camera main body 100 is calculated and then divided into the correction amount by IBIS and the correction amount by EIS, this is not restrictive. For example, the correction amount by IBIS may be calculated by multiplying the first correction amount by the IBIS correction ratio, and the correction amount by EIS may be calculated by multiplying the first correction amount by the EIS correction ratio. The IBIS correction ratio and the EIS correction ratio can be obtained based on the coordination control scheme and the information indicating the relationship between the amount of shake and the correction ratio (information indicating the graphs of FIGS. 3 and 4).

If the target position of the image sensor 101 corresponding to the third correction amount exceeds the driving limit, a camera driving range limiting unit 164 performs limit processing to adjust the correction amount within the driving limit. The output of the camera driving range limiting unit 164 is the final target correction amount by IBIS.

A camera feedback control unit 165 performs feedback control on the shift mechanism **101*a* using the current position obtained by the image sensor position detection unit 132 so that the image sensor 101 follows the target position corresponding to the third correction amount. The shift mechanism 101*a* thereby drives the image sensor 101 for image stabilization control. In the present exemplary embodiment, the camera feedback control unit 165** performs proportional-integral-derivative (PID) control based on the current position and the target correction amount. However, the feedback control scheme is not limited to the PID control, and P, PI, or PD control may be used.

If the camera control scheme determination unit 166 selects the second coordination scheme, a control interval determination unit 170 determines which of the control intervals illustrated in FIG. 4 the correction control is being performed in, based on the current amount of shake (output of the camera integral unit 161). If the camera ratio calculation unit 163 obtains which interval the correction control is being performed in to obtain the correction ratio, the interval determination result may be obtained from the camera ratio calculation unit 163. Conversely, the determination result of the control interval determination unit 170 may be output to the camera ratio calculation unit 163, and the camera ratio calculation unit 163 may obtain the ratio using the determination result.

If image blur correction is performed using the second coordination scheme, a correction strength determination unit 171 determines the strength of image blur correction on a tilt component (hereinafter, may be referred to as tilt correction) by EIS based on the determination result of the control interval determination unit 170 and the first correction amount. That the strength of image blur correction is high refers to a strong effect in correcting the detected blur. That the strength of image blur correction is low refers to a weak effect in correcting the detected blur. In the case of the first control scheme where the effect of reducing image blur in the peripheral areas of the image by optical image stabilization is relatively high, the correction strength determination unit 171 makes the strength of tilt correction low compared to the second control scheme where the effect of reducing image blur in the peripheral areas of the image by optical image stabilization is lower than in the first control scheme. In the present exemplary embodiment, the correction strength determination unit 171 determines the correction strength so that an upper limit value $\omega$ of the correction amount of the tilt component by EIS in the second control scheme is higher than in the first control scheme. Details of the method for determining the correction strength will be described below along with the method for image blur correction by the image correction unit 110 using projective transformation. When the first control scheme is performed in the second coordination scheme, image blur in the peripheral areas of the image can be further reduced by optical image stabilization compared to when the second control scheme is performed or the first coordination scheme is performed. In the second coordination scheme, the image blur in the peripheral areas of the image is therefore reduced by both optical image stabilization and EIS if the correction amount of the tilt component by IES is calculated in a manner similar to in the first coordination scheme. This can result in the overcorrection of the image blur in the peripheral areas of the image, and the image blur in the peripheral areas of the image may fail to be appropriately reduced. Such overcorrection can be made less likely to occur by the correction strength determination unit 171 determining the strength of the tilt correction by EIS as described above. This can make the image blur in the peripheral areas of image less likely to be overcorrected in the first control scheme, and less likely to be excessively controlled in the second control scheme. Since the strength of the tilt correction is changed based on the control scheme, the correction units for both optical image stabilization and EIS can be used to reduce image blur in the peripheral areas of the image. The image blur in the peripheral areas of the image can thus be further reduced compared to the cases where the image blur in the peripheral areas of the image is corrected by optical image stabilization alone and by EIS alone.

An EIS correction amount calculation unit 180 calculates a fifth correction amount based on the fourth correction amount that is the correction amount by EIS, the first correction amount that is the total correction amount, and the strength of the tilt correction determined by the correction strength determination unit 171. The fifth correction amount is the correction amount by EIS on which the strength of tilt correction determined by the correction strength determination unit 171 is reflected. If translational and rotational components are corrected by EIS, the fifth correction amount is calculated based on the fourth correction amount. For a tilt component, the correction amount for the tilt correction is calculated based on the first correction amount, since the tilt component differs from the components of blur correction to be made by OIS and IBIS. If the correction amount for the tilt correction calculated based on the first correction amount is less than or equal to the upper limit value w of the tilt correction determined by the correction strength determination unit 171, the calculated correction amount for the tilt correction is used as the correction amount for the tilt correction in the fifth correction amount. On the other hand, if the correction amount of the tilt component calculated based on the first correction amount exceeds the upper limit value w, the limit processing is performed on the calculated correction amount for the tilt correction. The correction amount for the tilt correction given the limit processing is then used as the correction amount for the tilt correction in the fifth correction amount. The limit processing is not limited to any particular method. For example, the calculated correction amount for the tilt correction may be replaced with the upper limit value ω. Alternatively, if the calculated correction amount for the tilt correction approaches ω, a coefficient of less than 1 may be multiplied so that the correction amount does not exceed ω. By the EIS correction amount calculation unit 180 thus obtaining the tilt correction amount by IES within the range of not exceeding the upper limit value ω of the correction amount for the tilt correction, EIS can be performed with the tilt correction strength corresponding to the control scheme. The method for calculating the fifth correction amount from the first and fourth correction amounts will be described in detail below in conjunction with the processing of the image correction unit 110.

If the fifth correction amount that is the EIS correction amount calculated by the EIS correction amount calculation unit 180 exceeds the EIS cropping range, an EIS cropping range limiting unit 181 performs limit processing to adjust the correction amount within the cropping range. The output of the EIS cropping range limiting unit 181 is the final EIS correction amount.

The image correction unit 110 performs EIS by performing image processing based on the EIS correction amount output from the EIS cropping range limiting unit 181.

The electronic image correction-based image blur correction (EIS) method performed by the image correction unit 110 will be described in detail. The image correction unit 110 corrects an image by geometric deformation using projective transformation. For example, the geometric deformation is expressed by the following (Eq. 1):

$$\begin{bmatrix} X1 \\ Y1 \\ 1 \end{bmatrix} = \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix}, \quad \text{(Eq. 1)}$$

where (X0, Y0) represents the coordinates of each pixel in the uncorrected image, and (X1, Y1) represents the coordinates of each pixel in the corrected image.

The 3×3 matrix in (Eq. 1) is typically called projective transformation matrix. As for the values of the elements (parameters) in this matrix, h1, h2, h4, and h5 represent the blur correction amount for a rotational component, h3 and h6 represent the blur correction amount for a translational component, h7 and h8 represent the blur correction amount for a tilt component. Transforming (Eq. 1) yields (Eq. 2) and (Eq. 3), whereby the coordinates (X1, Y1) of each pixel in the corrected image can be calculated:

$$X1 = \frac{h1X0 + h2Y0 + h3}{h7X0 + h8Y0 + 1}, \text{ and} \quad \text{(Eq. 2)}$$

$$Y1 = \frac{h4X0 + h5Y0 + h6}{h7X0 + h8Y0 + 1}. \quad \text{(Eq. 3)}$$

Suppose that the amount of angular shake in a pitch direction is $\theta_p$, the amount of angular shake in a yaw direction is $\theta_y$, the amount of angular shake in a roll direction is $\theta_r$, the translational correction amount in a horizontal direction is $t_x$, the translational correction amount in a vertical direction is $t_y$, the tilt correction amount in the horizontal direction is $v_x$, the tilt correction amount in the vertical direction is $v_y$, and the focal length is f. The elements h1 to h8 of the 3×3 matrix in (Eq. 1) can thus be expressed by (Eq. 4) to (Eq. 11):

$$h1 = \cos\theta_r, \quad \text{(Eq. 4)}$$

$$h2 = -\sin\theta_r, \quad \text{(Eq. 5)}$$

$$h3 = t_x = f\tan\theta_y, \quad \text{(Eq. 6)}$$

$$h4 = \sin\theta_r, \quad \text{(Eq. 7)}$$

$$h5 = \cos\theta_r, \quad \text{(Eq. 8)}$$

$$h6 = t_y = f\tan\theta_p, \quad \text{(Eq. 9)}$$

-continued $$h7 = v_x = -\frac{\tan\theta_y}{f}, \text{ and} \quad \text{(Eq. 10)}$$

$$h8 = v_y = -\frac{\tan\theta_p}{f}. \quad \text{(Eq. 11)}$$

To correct blur due to the angular shake $\theta_p$ in the pitch direction, the blur correction amount $t_y$ for the translational component in the vertical direction and the blur correction amount $v_y$ for the tilt component in the vertical direction are calculated from (Eq. 9) and (Eq. 11). To correct blur due to the angular shake $\theta_y$ in the yaw direction, the blur correction amount $t_x$ for the translational component in the horizontal direction and the blur correction amount $v_x$ for the tilt component in the horizontal direction are calculated from (Eq. 6) and (Eq. 10). To correct blur due to the angular shake Or in the roll direction, the blur correction amount in the rotational direction is calculated from (Eq. 4), (Eq. 5), (Eq. 7), and (Eq. 8).

In the present exemplary embodiment, up to the calculation of the parameters (hereinafter, may be referred to as EIS correction parameters) h1 to h8 using the foregoing equations is performed by the EIS correction amount calculation unit 180 and the EIS cropping range limiting unit 181. The projective transformation using the parameters is performed by the image correction unit 110. The blur components can thereby be corrected to enable electronic image correction-based image blur correction (EIS).

The EIS correction parameters h1, h2, h4, and h5 for the rotational component are calculated using the same calculation method in both the first and second coordination schemes. The EIS correction amount calculation unit 180 calculates the EIS correction parameters h1, h2, h4, and h5 for the rotational component from (Eq. 4), (Eq. 5), (Eq. 7), and (Eq. 8) by substituting the roll correction angle of the fourth correction amount into the amount of angular shake $\theta_r$ of the EIS rotational component. The calculated parameters constitute the correction amount for the rotational component in the fifth correction amount.

The EIS correction parameters h3 and h6 for the translational component are calculated using the same calculation method in both the first and second coordination schemes. The EIS correction amount calculation unit 180 calculates the EIS correction parameters h3 and h6 from (Eq. 6) and (Eq. 9) by substituting the pitch correction angle of the fourth correction amount into the amount of angular shake $\theta_p$ in the pitch direction and the yaw correction angle of the fourth correction amount into the amount of angular shake $\theta_y$ in the yaw direction. The calculated parameters constitute the correction amount for the translational component in the fifth correction amount.

As described above, the EIS correction parameters h7 and h8 for the tilt component are subject to the limit processing by the EIS correction amount calculation unit 180. The calculation method differs between the first and second coordination schemes since the limit processing is not needed in the first coordination scheme. In the first coordination scheme, the EIS correction amount calculation unit 180 calculates the EIS correction parameter h8 for the tilt component by substituting the pitch correction angle of the first correction amount into the angular amount of shape $\theta_p$ in the pitch direction in (Eq. 11). The EIS correction amount calculation unit 180 then calculates the EIS correction parameter h7 for the tilt component by substituting the yaw correction angle of the first correction amount into the amount of angular shake $\theta_y$ in the yaw direction in (Eq. 10).

In the second coordination scheme, the foregoing limit processing is further performed. Initially, as with the first coordination scheme, the tilt correction parameters h7 and h8 are calculated using the first correction amount, (Eq. 10), and (Eq. 11). Next, the EIS correction amount calculation unit 180 compares the calculated EIS tilt correction parameters h7 and h8 with the upper limit value ω of the EIS tilt correction determined by the correction strength determination unit 171. If the EIS tilt correction parameters h7 and h8 exceed the correction upper limit value ω, the EIS correction amount calculation unit 180 performs the limit processing to adjust the EIS tilt correction parameters h7 and h8 within the correction upper limit value ω.

The upper limit value ω of the tilt correction amount (tilt correction parameters) determined by the correction strength determination unit 171 will be described with reference to FIGS. 5A to 5C. The horizontal axes of FIGS. 5A to 5C indicate the image blur correction amount (first correction amount), and the vertical axes the upper limit value of the EIS tilt correction parameters h7 and h8 that are the EIS tilt correction amount. As described above, since the first control scheme has a higher effect in reducing image blur in the peripheral areas of the image by optical image stabilization than the second control scheme, the upper limit value of the tilt correction amount in the first control scheme is set lower than that in the second control scheme.

Figure 5A:
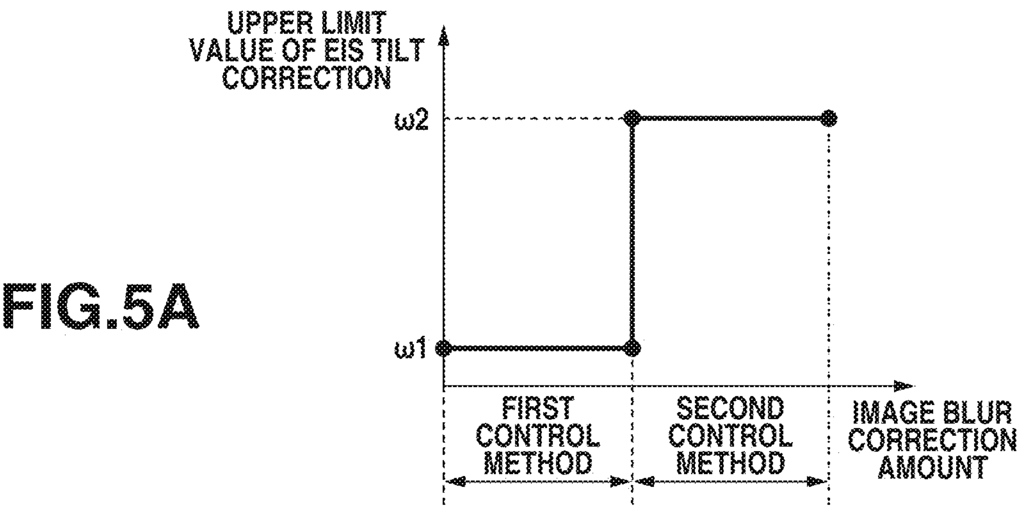
FIGS. 5A to 5C are diagrams for describing a relationship between an image blur correction amount and an upper limit value of tilt correction according to the exemplary embodiment.

FIG. 5A illustrates an example of the upper limit value of the tilt correction amount determined by the correction strength determination unit 171. The upper limit value of the correction amount controlled using the first correction method is ω1, and the upper limit value of the correction amount controlled using the second correction method is ω2. The two upper limit values satisfy the relationship ω1<ω2. As a result, during the control using the first control scheme (during a first control), the upper limit value of the EIS tilt correction parameters h7 and h8 is limited to ω1. During the control using the second control scheme (during a second control), the upper limit value of the EIS tilt correction parameters h7 and h8 is limited to ω2. The strength of the tilt correction can thus be made higher during the second control than during the first control.

Figure 5B:
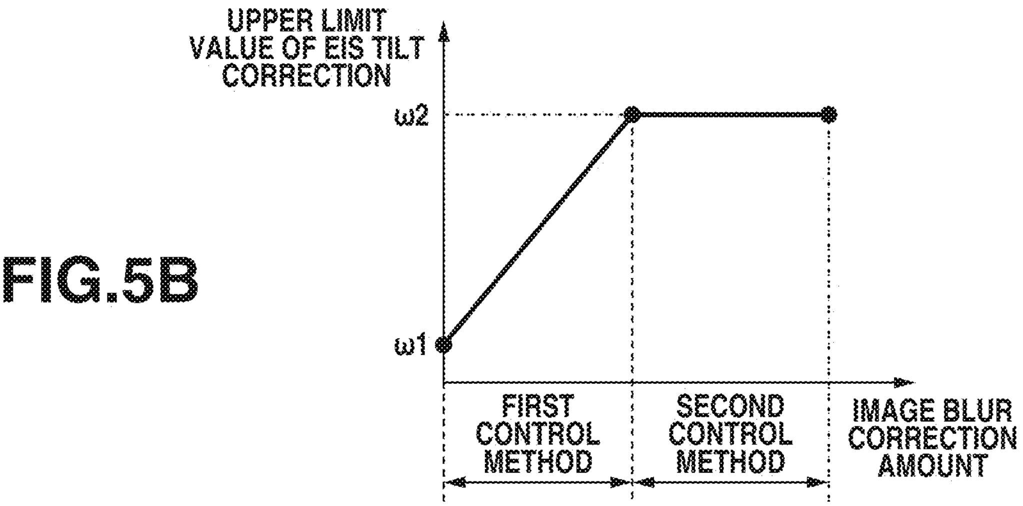
Figure 5C:
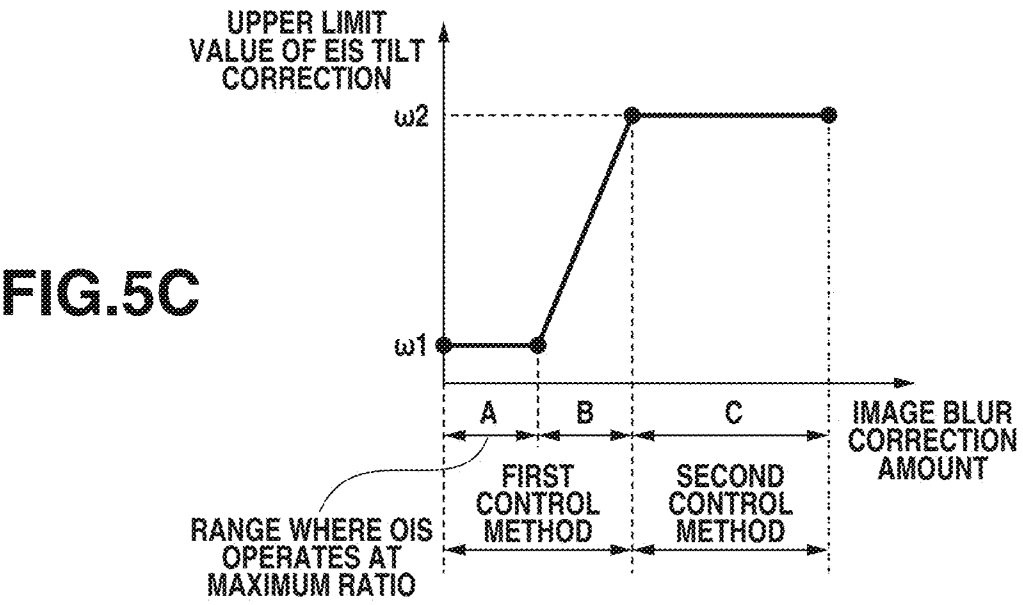

FIG. 5B illustrates another example of the upper limit value of the tilt correction amount. As illustrated in FIG. 5B, in the interval where the first control scheme is used for control, the upper limit value ω1 of the tilt correction amount may be changed depending on the amount of blur. FIG. 5B illustrates an example where, in the interval where the first control scheme is used for control, the upper limit value of the correction is increased from ω1 to ω2 in proportion to the increase in the image blur correction amount. However, the upper limit value may be increased from ω1 to ω2 in a plurality of steps. In one embodiment, the upper limit value increases monotonically as the amount of blur increases, since the greater the amount of image blur, the smaller the effect of optical image stabilization in correcting image blur in the peripheral areas tends to be. As illustrated in FIG. 5C, in the interval where the first control scheme is used for control, the upper limit value of correction may be changed between the interval where OIS operates at the maximum ratio as described with reference to FIG. 4 (interval A in FIG. 4) and the interval where correction is made by reducing the IBIS reverse correction amount as the image blur correction amount increases (interval B in FIG. 4). FIG. 5C illustrates an example where the upper limit value of correction in the interval A is ω1 (constant), and the upper limit value of correction in the interval B is increased from ω1 to ω2 in proportion to the increase in the image blur correction amount. In the interval B, the effect of optical image stabilization in reducing image blur in the peripheral areas of the image optical image stabilization is lower than in the interval A, since OIS is unable to operate at the maximum ratio. The upper limit value of the OIS tilt correction amount is thus increased gradually in proportion to the amount of image blur so that the EIS tilt correction compensates for the effect of optical image stabilization in reducing image blur in the peripheral areas of the image. This enables further reduction of image blur in the peripheral areas of the image.

Figure 6A:
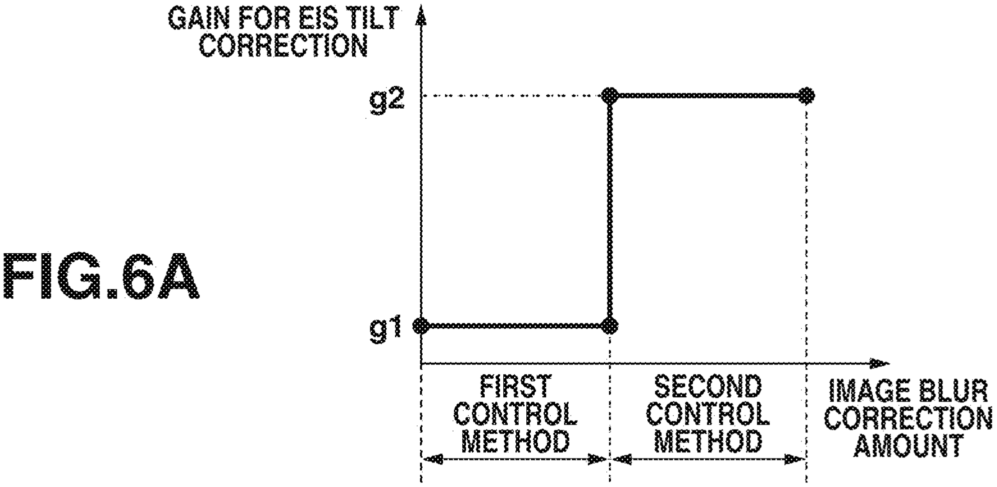
FIGS. 6A to 6C are diagrams for describing a relationship between the image blur correction amount and a tilt correction gain according to the exemplary embodiment.

The strength of the tilt correction may be changed by other methods. For example, a gain to multiply the correction amount by may be changed. In such a case, the correction strength determination unit 171 determines a correction gain g for the EIS tilt correction as the correction strength. The EIS correction amount calculation unit 180 then calculates EIS tilt correction parameters to be used for projective transformation by multiplying the EIS tilt correction parameters h7 and h8 calculated as with the first coordination scheme by the correction gain g. Examples of the correction gain g will be described with reference to FIGS. 6A to 6C. The horizontal axes indicate the first correction amount, and the vertical axes the determined gain g for the tilt correction. FIG. 6A illustrates an example of the correction gain g determined by the correction strength determination unit 171. The tilt correction gain for the correction amount controlled using the first control scheme is g1, and the tilt correction gain for the correction amount controlled using the second control scheme is g2. The two gains satisfy the relationship $g1<g2$. The tilt correction parameters h7 and h8 to be actually used for projective transformation are calculated by multiplying the tilt correction parameters h7 and h8 by the correction gain g1 during the control using the first control scheme, and multiplying the tilt correction parameters h7 and h8 by the correction gain g2 during the control using the second control scheme. The strength of the tilt correction can thus be made higher during the second control than during the first control.

Figure 6B:
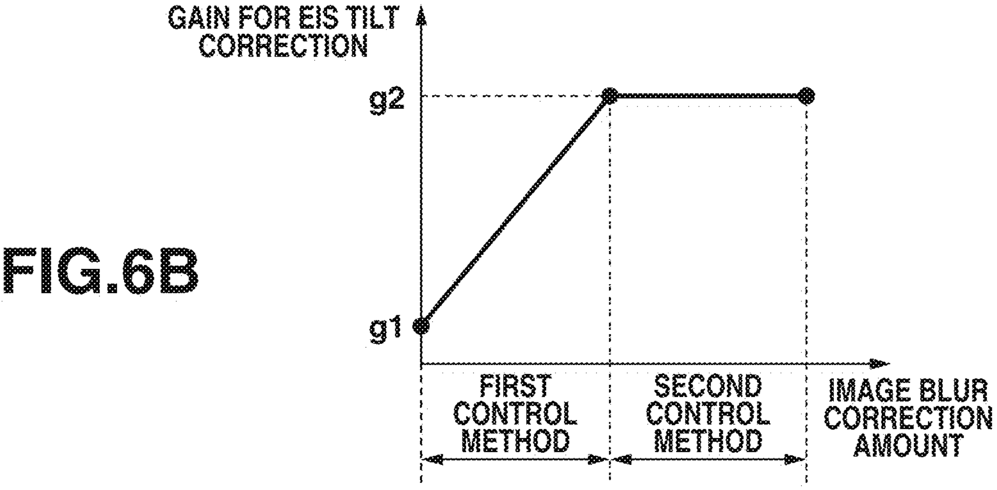
Figure 6C:
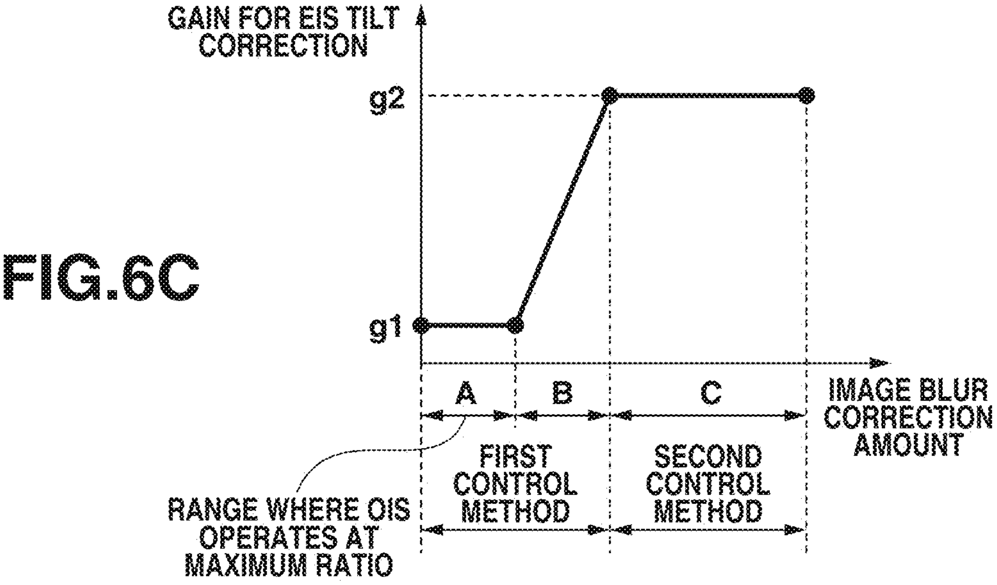

FIG. 6B illustrates another example of the correction gain for tilt correction. As illustrated in FIG. 6B, the correction gain may be changed depending on the image blur correction amount in the interval where the first control scheme is used for control. FIG. 6B illustrates an example where, in the interval where the first control scheme is used for control, the correction gain is increased from g1 to g2 in proportion to the increase in the image blur correction amount. However, like the upper limit value, the correction gain may be increased in a plurality of steps. Note that, in one embodiment, the correction gain increases monotonically as the image blur correction amount increases. As illustrated in FIG. 6C, in the interval where the first correction scheme is used for control, the correction gain may be changed between the interval where OIS operates at the maximum ratio as described with reference to FIG. 4 (interval A in FIG. 4) and the interval where correction is made by reducing the IBIS reverse correction amount as the image blur correction amount increases (interval B in FIG. 4). FIG. 6C illustrates an example where the correction gain in the interval A is g1 (constant), and the correction gain in the interval B is increased from g1 to g2 in proportion to the increase in the image blur correction amount. As described above, the effect of optical image stabilization in reducing image blur in the peripheral areas of the image is lower in the interval B than in the interval A. In the interval B, the gain for the EIS tilt correction is therefore increased gradually in proportion to the amount of image blur so that the EIS tilt correction compensates for the effect of optical image stabilization in reducing image blur in the peripheral areas of the image. This enables further reduction of image blur in the peripheral areas of the image.

A configuration of the image blur correction control unit 224 of the interchangeable lens 200 will be described. The image blur correction control unit 224 of the interchangeable lens 200 receives input of the detection result of the shake angular velocity as the shake detection signal from the lens shake detection unit 228. A lens integral unit 251 of the image blur correction control unit 224 converts the shake angular velocity into a shake angle by integrating the input shake angular velocity. In the present exemplary embodiment, the lens integral unit 251 is also an integral LPF.

A lens blur correction amount calculation unit 252 calculates the correction amount (sixth correction amount) to cancel the shake angle by taking into consideration the frequency band of the converted shake angle and the drivable range of the interchangeable lens 200. A specific example of the processing is band-pass filter processing for extracting a specific frequency band targeted for the blur correction from the input shake angle signal.

Like the camera control scheme determination unit 166, a lens control scheme determination unit 256 determines which scheme to perform the coordinated control of IBIS, OIS, and EIS in, the first coordination scheme or the second coordination scheme. As for the determination method, like the camera control scheme determination unit 166, the lens control scheme determination unit 256 selects the second coordination scheme if both the camera main body 100 and the interchangeable lens 200 support the second coordination scheme. Instead of the lens control scheme determination unit 256 making the determination, the determination result may be obtained from the camera control scheme determination unit 166. Conversely, the lens control scheme determination unit 256 may determine the coordination scheme and transmit the determination result to the camera main body 100 to substitute for the camera control scheme determination unit 166.

A lens ratio calculation unit 253 obtains the correction ratio that the interchangeable lens 200 is in charge of with the total blur correction amount by the camera main body 100 and the interchangeable lens 200 as 100%, and calculates a seventh correction amount by multiplying the sixth correction amount calculated by the lens blur correction amount calculation unit 252 by the correction ratio. Like the camera ratio calculation unit 163, the lens ratio calculation unit 253 obtains the correction ratio based on the coordination scheme. If the coordination scheme is the second coordination scheme, the correction ratio is obtained based on data indicating the relationship between the amount of shake and the ratio and the amount of shake detected. The correction ratio that the interchangeable lens 200 is in charge of may be obtained by the camera ratio calculation unit 163 calculating the correction ratio of the interchangeable lens 200 as well and transmitting the correction ratio, and the lens ratio calculation unit 253 receiving the correction ratio. The camera ratio calculation unit 163 may transmit the correction ratio of the camera main body 100 to the lens ratio calculation unit 253, and the lens ratio calculation unit 253 may obtain the correction ratio of the interchangeable lens 200 based on the correction ratio of the camera main body 100 received. The roles of the lens ratio calculation unit 253 and the camera ratio calculation unit 163 may be reversed, and the lens ratio calculation unit 253 may obtain the correction ratio of the camera main body 100 and the interchangeable lens 200 and transmit the correction ratio of the camera main body 100 to the camera main body 100, or transmit the correction ratio of the interchangeable lens 200 to the camera main body 100.

If the target position of the image blur correction lens 204 corresponding to the fourth correction amount exceeds the driving limit, a lens driving range limiting unit 254 performs limit processing to adjust the correction amount within the driving limit. The output of the lens driving range limiting unit 254 is the final target value of the OIS correction amount.

A lens feedback control unit 255 performs feedback control on the shift mechanism 204*a* using the current position obtained by the lens position detection unit 234 so that the image blur correction lens 204 follows the target position corresponding to the seventh correction amount. The shift mechanism 204*a* thereby drives OIS for image stabilization control.

Figure 7:
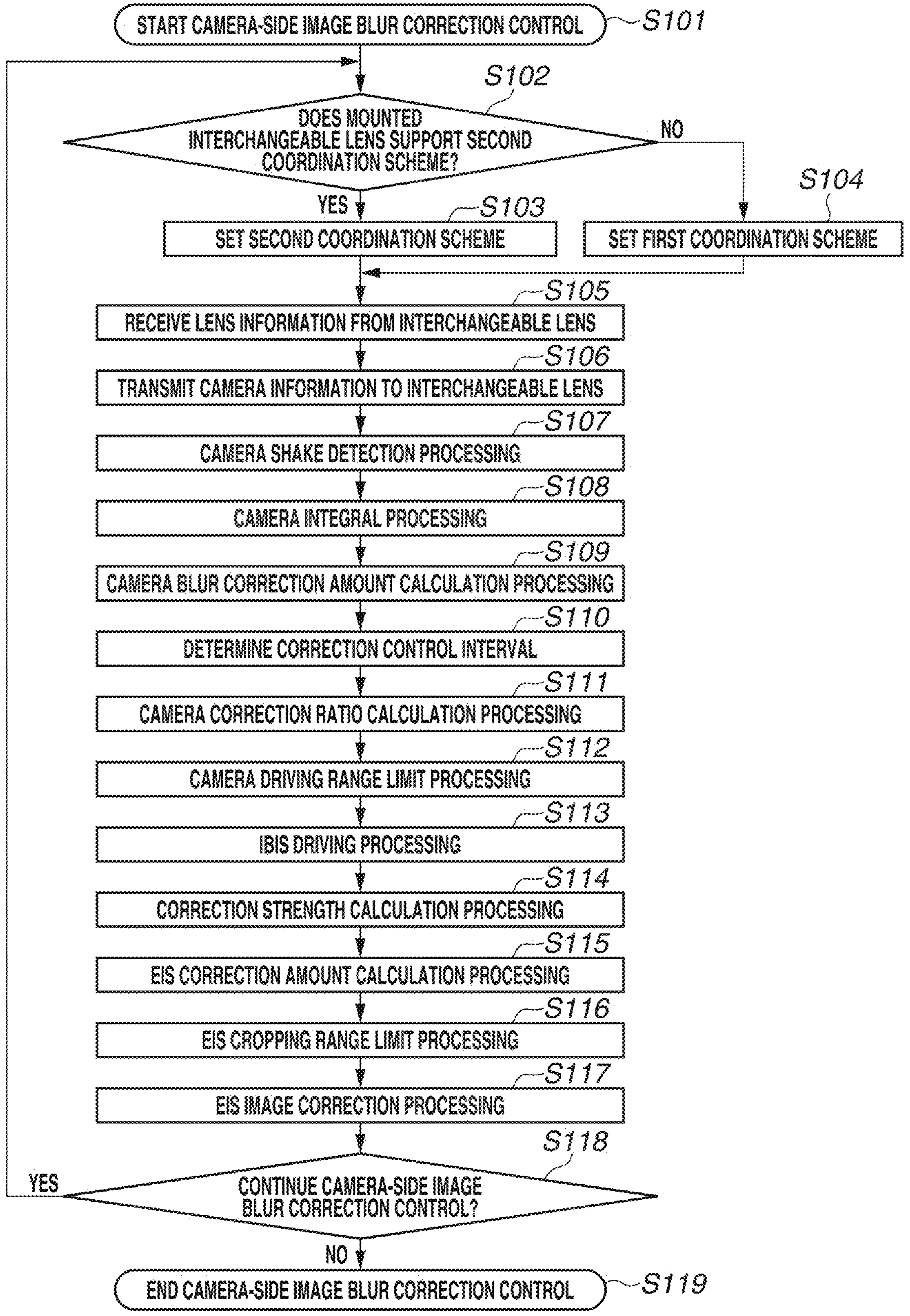
FIG. 7 is a flowchart illustrating processing of the camera main body according to the exemplary embodiment.
Figure 8:
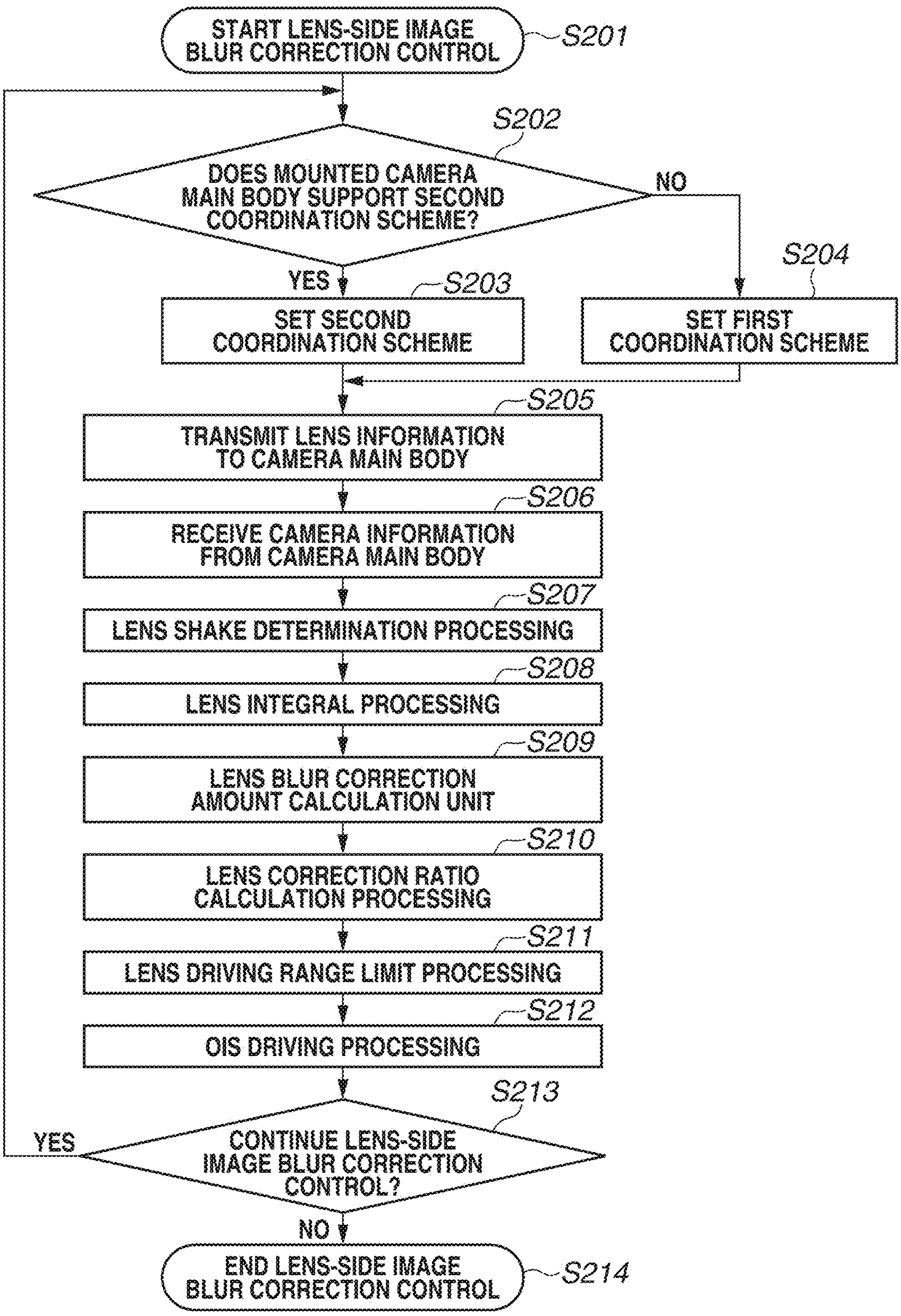
FIG. 8 is a flowchart illustrating processing of the interchangeable lens according to the exemplary embodiment.

The image blur correction processing performed in the present exemplary embodiment will be described with reference to the flowcharts of FIGS. 7 and 8. FIG. 7 is a flowchart of the image blur correction processing performed by the camera main body 100 according to the present exemplary embodiment. FIG. 8 is a flowchart of the image blur correction processing performed by the interchangeable lens 200 according to the present exemplary embodiment.

The image blur correction processing by the camera main body 100 will be described with reference to FIG. 7. This processing is performed by the image blur correction control unit 103 unless otherwise specified. In step S101, the image blur correction control unit 103 initially receives instructions from the camera microcomputer 102 and starts image blur correction control (camera-side image blur correction control).

In step S102, the camera control scheme determination unit 166 of the image blur correction control unit 103 determines whether the mounted interchangeable lens 200 supports the second coordination scheme, based on information indicating the model number of the interchangeable lens 200. If the mounted interchangeable lens 200 supports the second coordination scheme (YES in step S102), the processing proceeds to step S103. In step S103, the camera control scheme determination unit 166 determines to perform the following image blur correction control using the second coordination scheme, and sets the second coordination scheme as the coordination scheme to be used for the image blur correction control. If the mounted interchangeable lens 200 does not support the second coordination scheme (NO in step S102), the processing proceeds to step S104. In step S104, the camera control scheme determination unit 166 determines to perform the following image blur correction control using the first coordination scheme, and sets the first coordination scheme as the coordination scheme to be used for the image blur correction control.

With the coordination scheme to be used for the image blur correction control set in step S103 or S104, the processing proceeds to step S105. In step S105, the camera microcomputer 102 obtains lens information from the interchangeable lens 200 via the camera communication unit 106, and stores the lens information in the lens information management unit 129. The lens information to be stored is as described above, and a description thereof will thus be omitted.

In step S106, the camera microcomputer 102 transmits camera information to the interchangeable lens 200 via the camera communication unit 106. The camera information to be transmitted is as described above, and a description thereof will thus be omitted.

In step S107, the image blur correction control unit 103 obtains the result of shake detection from the camera shake detection unit 105. The result of shake detection obtained is input to the camera integral unit 161.

In step S108, the camera integral unit 161 performs the LPF processing on the input detection result of the camera shake detection unit 105 for pseudo-integration.

In step S109, the camera blur correction amount calculation unit 162 calculates the first correction amount based on the amount of shake input from the camera integral unit 161. Details of the calculation of the first correction amount are as described above, and a description thereof will thus be omitted.

In step S110, the control interval determination unit 170 determines whether the current control interval corresponds to the interval A or B of FIG. 4 where OIS and IBIS perform reverse correction, and outputs the determination result to the camera ratio calculation unit 163 and the correction strength determination unit 171. As described above, this determination is made based on the magnitude of the amount of shake. If the amount of shake and the first correction amount are substantially the same, the determination may be made based on the first correction amount.

In step S111, the camera ratio calculation unit 163 obtains the camera correction ratio that the camera main body 100 is in charge of based on the determination result of the camera control scheme determination unit 166. Moreover, the camera ratio calculation unit 163 calculates the second correction amount that is the camera-side blur correction amount by multiplying the first correction amount input from the camera blur correction amount calculation unit 162 by the obtained camera correction ratio. The camera ratio calculation unit 163 also obtains the IBIS correction ratio that IBIS is in charge of, and calculates the third correction amount, which is the blur correction amount that IBIS is in charge of, by multiplying the camera-side blur correction amount by the IBIS correction ratio. The camera ratio calculation unit 163 also obtains the EIS correction ratio that EIS is in charge of, and calculates the fourth correction amount, which is the blur correction amount that EIS is in charge of, by multiplying the camera-side blur correction amount by the EIS correction ratio. The methods for obtaining the respective correction ratios are as described above, and details thereof will thus be omitted. In the case of the second coordination scheme, the correction ratios are obtained depending on which of the control intervals (one of the intervals A to C) is relevant.

In step S112, if the target position of the image sensor 101 corresponding to the camera-side blur correction amount calculated exceeds the limit of the driving range of the image sensor 101, the camera driving range limiting unit 164 performs the limit processing to calculate the final target correction amount for IBIS.

In step S113, the camera feedback control unit 165 controls the shift mechanism 101*a* based on the position of the image sensor 101 detected by the image sensor position detection unit 132 and the camera-side target correction amount input from the camera driving range limiting unit 164. The camera feedback control unit 165 thereby controls the position of the image sensor 101 to perform IBIS driving processing.

In step S114, the correction strength determination unit 171 determines the strength of the image blur correction of the tilt component by EIS based on the determination result of the control interval determination unit 170 and the first correction amount calculated by the camera blur correction amount calculation unit 162. The determination method is as already described, and a description thereof will thus be omitted. If the strength can be determined based on the control scheme as in FIGS. 5A and 6A, the strength may be determined based on the determination result of the control interval determination unit 170.

In step S115, the EIS correction amount calculation unit 180 calculate the EIS correction amount based on the blur correction amount by EIS (fourth correction amount) output from the camera ratio calculation unit 163, the first correction amount, and the strength of the EIS tilt correction determined by the correction strength determination unit 171. The calculation method is as already described, and a description thereof will thus be omitted. The tilt correction parameters h7 and h8 to be used for projective transformation are calculated in this step even in a case where the rotational component or the translational component is not electrically corrected.

In step S116, if the EIS correction amount calculated by the EIS correction amount calculation unit 180 exceeds the cropping range of EIS, the EIS cropping range limiting unit 181 performs the limit processing to adjust the correction amount within the cropping range.

In step S117, the image correction unit 110 performs electronic image correction-based image blur correction by performing geometric deformation using projective transformation based on the correction amount output from the EIS cropping range limiting unit 181, and generates blur-corrected image data.

In step S118, the image blur correction control unit 103 of the camera main body 100 determines whether to continue the camera-side image blur correction control. If the camera-side image blur correction control is determined to be continued (YES in step S118), the processing returns to step S102. Assuming that the mounted interchangeable lens 200 remains unchanged, the processing may return to step S105. In such a case, the processing may be configured to return to step S102 if a change of the mounted interchangeable lens 200 is detected. If the image blur correction is determined to not be continued (NO in step S118), like when the user turns off the camera-side image blur correction function or when the camera main body 100 enters a playback mode, the processing ends.

The image blur correction processing by the interchangeable lens 200 will be described with reference to FIG. 8. This processing is performed by the image blur correction control unit 224 unless otherwise specified. In step S201, the image blur correction control unit 224 initially receives instructions from the lens microcomputer 226 and starts the image blur correction control (lens-side image blur correction control).

In step S202, the lens control scheme determination unit 256 of the image blur correction control unit 224 determines whether the camera main body 100 on which the interchangeable lens 200 is mounted (hereinafter, may be referred to as "the mounted camera main body 100") supports the second coordination scheme, based on information indicating the model number of the mounted camera main body 100. If the mounted camera main body 100 supports the second coordination scheme (YES in step S202), the processing proceeds to step S203. In step S203, the lens control scheme determination unit 256 determines to perform the following image blur correction control using the second coordination scheme, and sets the second coordination scheme as the coordination scheme to be used for the image blur correction control. If the mounted camera main body 100 does not support the second coordination scheme (NO in step S202), the processing proceeds to step S204. In step S204, the lens control scheme determination unit 256 determines to perform the following image blur correction control using the first coordination scheme, and sets the first coordination scheme as the coordination scheme to be used for the image blur correction control.

In either of steps S203 and S204, the lens control scheme determination unit 256 outputs the determination result to the lens ratio calculation unit 253 and the lens driving range limiting unit 254. Instead of determining whether the camera main body 100 supports the second coordination scheme using the model number of the camera main body 100, the lens control scheme determination unit 256 may obtain the determination result about which to perform the image blur correction control in, the first coordination scheme or the second coordination scheme, from the camera main body 100, and set the coordination scheme based on the obtained determination result.

With the coordination scheme to be used for the image blur coordination scheme set in step S203 or S204, the processing proceeds to step S205. In step S205, the lens microcomputer 226 transmits the lens information to the camera main body 100 via the lens communication unit 229. This step corresponds to step S105 of FIG. 7.

In step S206, the lens microcomputer 226 obtains the camera information from the camera main body 100 via the lens communication unit 229, and stores the camera information in the camera information management unit 237. This step corresponds to step S106 of FIG. 7.

In step S207, the image blur correction control unit 224 obtains the detection result from the lens shake detection unit 228. The obtained shake detection result is input to the lens integral unit 251.

In step S208, the lens integral unit 251 performs the LPF processing on the input detection result of the lens shake detection unit 228 for pseudo-integration.

In step S209, the lens blur correction amount calculation unit 252 calculates the blur correction amount based on the amount of shake input from the lens integral unit 251. Details of the calculation of the blur correction amount are as described above, and will thus be omitted.

In step S210, the lens ratio calculation unit 253 obtains the correction ratio that the interchangeable lens 200 is in charge of based on the determination result of the lens control scheme determination unit 256. The lens ratio calculation unit 253 then calculates the lens-side blur correction amount by multiplying the blur correction amount input from the lens blur correction amount calculation unit 252 by the obtained correction ratio. The method for obtaining the correction ratio is as described above, and details thereof will thus be omitted. In the case of the second control scheme, the correction ratio corresponding to the relevant control interval (one of the intervals A to C) is obtained. For that purpose, the lens ratio calculation unit 253 refers to the determination result of the control interval determination unit 170 obtained in step S206.

In step S211, if the target position of the image blur correction lens 204 corresponding to the lens-side blur correction amount calculated exceeds the limit of the driving range of the image blur correction lens 204, the lens driving range limiting unit 254 performs the limit processing.

In step S212, the lens feedback control unit 255 controls the shift mechanism 204*a* based on the position of the image blur correction lens 204 detected by the lens position detection unit 234 and the lens-side target correction amount input from the lens driving range limiting unit 254.

The lens feedback control unit 255 thereby controls the position of the image blur correction lens 204 to perform OIS driving processing.

In step S213, the image blur correction control unit 224 of the interchangeable lens 200 determines whether to continue the lens-side image blur correction control. If the image blur correction control is determined to be continued (YES in step S213), the processing returns to step S202. Assuming that the mounted camera main body 100 remains unchanged, the processing may return to step S205. In such a case, the processing may be configured to return to step S202 if a change of the mounted camera main body 100 is detected. If the image blur correction control is determined to not be continued (NO in step S213), like when the user turns off the lens-side image blur correction function, the processing ends.

According to the present exemplary embodiment, the image blur correction of the tilt component by electronic image stabilization (EIS) can be performed based on the magnitude of the image blur correction in the peripheral areas of the image by optical image stabilization (OIS and IBIS). An image blur correction apparatus that can further reduce image blur in the peripheral areas of the image can be provided as compared to when the image blur in the peripheral areas of the image is corrected by either of optical image stabilization and electronic image stabilization or when the image blur correction of the tilt component by electronic image stabilization is performed at the same strength regardless of the control scheme. This is particularly effective in reducing image blur occurring in the peripheral areas of a moving image in capturing the moving image walking with the imaging apparatus held in hand.

Modifications

In the foregoing exemplary embodiment, the target correction amount for IBIS is calculated by the camera main body 100, and the target correction amount for OIS is calculated by the interchangeable lens 200. However, the target correction amounts for both IBIS and OIS may be calculated by one of the camera main body 100 and the interchangeable lens 200, and the calculated target correction amounts may be transmitted to the other.

In the foregoing exemplary embodiment, the target correction amounts are calculated based on the amounts of shake calculated through pseudo-integration of the angular velocity detected by the angular velocity sensors. However, the method for calculating the target correction amounts is not limited thereto.

For example, the target correction amounts may be calculate based on acceleration detected by acceleration sensors, or a motion vector calculated based on an image. A plurality of pieces of such information may be used to calculate the amounts of shake.

The foregoing exemplary embodiment has dealt with a camera system (imaging system) including the camera main body 100 and the interchangeable lens 200 detachably attachable to the camera main body 100. However, the present exemplary embodiment can also be applied to a fixed-lens camera as long as the camera has an OIS function, an IBIS function (for image blur correction by moving an image sensor), and an EIS function for tilt correction. The present exemplary embodiment is also applicable to various electronic devices such as a smartphone, a tablet, a wearable device, and a drone, as long as the devices include a camera unit having an OIS function, an IBIS function, and an EIS tilt correction function. Moreover, the foregoing control does not need to be entirely performed by the camera main body 100 or the interchangeable lens 200. For example, some or all of the processing performed by the image blur correction control units 103 and 224 of the camera main body 100 and the interchangeable lens 200 may be performed by an external device or in the cloud. In such a case, the control apparatus for controlling OIS, IBIS, and EIS is not only configured within the camera main body 100 and the interchangeable lens 200 but also configured to include the external device or the cloud.

In the foregoing exemplary embodiment, the image blur correction control unit 103 of the camera main body 100 also functions as a control unit for controlling OIS by outputting the correction ratio of OIS to the interchangeable lens 200. However, the division of roles between the image blur correction control unit 103 of the camera main body 100 and the image blur correction control unit 224 of the interchangeable lens 200 can be changed as appropriate. For example, the image blur correction control unit 224 of the interchangeable lens 200 may determine the correction ratio of IBIS and the correction strength of EIS, and output the correction ratio and the correction strength to the camera main body 100. The image blur correction control unit 103 of the camera main body 100 may output source information for determining the correction ratio of OIS to the interchangeable lens 200 instead of the correction ratio of OIS itself. Examples of the source information in the first coordination scheme illustrated in FIG. 3 may include the correction ratio of IBIS and EIS. If the correction ratio of IBIS and EIS is output to the interchangeable lens 200, the correction ratio of OIS can be calculated backwards. In the case of the first control scheme where overcorrection control is performed by OIS and the excess is cancelled by IBIS, and OIS operates at the maximum ratio as in the interval A illustrated in FIG. 4, information indicating the interval A can be used as the source information. Information indicating the relationship between the amount of shake of the imaging apparatus and the correction ratio of OIS, such as illustrated in FIGS. 3 and 4, can also be used as the source information. If the image blur correction control unit 103 outputs the information indicating the relationship between the amount of shake of the imaging apparatus and the correction ratio of OIS to the interchangeable lens 200, the image blur correction control unit 224 of the interchangeable lens 200 can determine the correction ratio of OIS based on the current amount of shake.

Conversely, the image blur correction control unit 224 of the interchangeable lens 200 may output information for determining the correction ratio of IBIS and EIS to the camera main body 100. Like the information for the camera main body 100 to output to the interchangeable lens 200, an example of the source information in the case of the first coordination scheme may be information about the correction ratio of OIS. Information indicating the relationship between the amount of shake of the imaging apparatus and the correction ratio of IBIS or information indicating the relationship between the amount of shake and the correction of EIS can also be used.

As employed in the present exemplary embodiment and this specification, the source information for determining the correction ratio of OIS or that of IBIS may be referred to as information about the correction ratio between OIS and IBIS. If EIS also participates in the correction as in FIGS. 3 and 4, information about the correction ratio between OIS, IBIS, and EIS, not just OIS and IBIS, is used as the information about the correction ratio between OIS and IBIS.

Instead of the information about the correction ratio, the OIS correction amount or the IBIS correction amount can be output to control OIS and IBIS. For example, the image blur correction control unit 103 of the camera main body 100 may control OIS by outputting the OIS correction amount to the interchangeable lens 200. The image blur correction control unit 103 may control OIS by outputting the camera-side correction amount (IBIS correction amount+EIS correction amount) to the interchangeable lens 200. In the latter case, the image blur correction control unit 224 of the interchangeable lens 200 can calculate the deficiency in the correction amount based on the detection result of the lens shake detection unit 228 and the camera-side correction amount, and correct the deficiency using OIS. With such a control, the image blur correction control unit 224 of the interchangeable lens 200 can calculate the OIS correction amount regardless of the coordination scheme or the interval. The same applies when the image blur correction control unit 224 of the interchangeable lens 200 controls IBIS and EIS. The image blur correction control unit 224 of the interchangeable lens 200 may output the IBIS correction amount and the EIS correction amount to the camera main body 100, or output the OIS correction amount.

The first control scheme does not need to include the tilt correction. In such a case, the strength of the tilt correction is zero. If the upper limit value is set, the upper limit value in the first control scheme is set to zero. If the gain is set, the gain in the first control scheme is set to 0. This enables electronic tilt correction in the second control scheme without performing electronic tilt correction in the first control scheme. Alternatively, the first control scheme may be configured so that electronic tilt correction is omitted if some conditions are met. For example, electronic tilt correction may be omitted in the interval A of FIG. 4 while electronic tilt correction is performed in the interval B despite during the first control.

Other Exemplary Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

According to an exemplary embodiment of the disclosure, a control apparatus that can appropriately reduce the effect of blur even if the amount of blur to occur varies with image height can be provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-138003, filed Aug. 28, 2023, which is hereby incorporated by reference herein in its entirety.

What is claimed is:

1. A control apparatus for controlling blur correction by a first correction unit configured to change a direction of an axis of a system by moving an element included in the system, a second correction unit configured to move a sensor in a direction intersecting the axis, and a third correction unit configured to correct, by processing, a tilt component of blur occurring from shake of an imaging apparatus in an image generated by processing a signal output from the sensor, the sensor being configured to capture an object image formed by light transmitted through the system, the control apparatus comprising one or more processors that execute a program stored in a memory and thereby function as:

a determination unit configured to determine a strength of the blur correction of the tilt component by the third correction unit;

a calculation unit configured to calculate a correction amount of the third correction unit based on the determined strength of the blur correction and an amount of shake of the imaging apparatus; and a control unit configured to control the first correction unit and the second correction unit using a plurality of schemes including at least a first scheme and a second scheme, wherein the determination unit is configured to, in a case where the control unit controls the first and second correction units using the first scheme, determine a first correction strength as the strength of the blur correction, and in a case where the control unit controls the first and second correction units using the second scheme, determine a second correction strength higher than the first correction strength as the strength of the blur correction, and wherein the third correction unit is configured to correct blur by geometrically deforming the image using projective transformation.

2. The control apparatus according to claim 1, wherein the first scheme has a greater effect than the second scheme in reducing blur in an area of the image where image height is high.

3. The control apparatus according to claim 1, wherein the first scheme is a scheme for moving the sensor in a same direction as a direction of movement of the object image with respect to the sensor due to the shake of the imaging apparatus, and wherein the second scheme is a scheme for moving the sensor in a direction of reducing a movement of the object image with respect to the sensor due to the shake of the imaging apparatus.

4. The control apparatus according to claim 1, wherein the first scheme is a scheme for moving the element so that a position of the object image moves more than an amount of movement of the object image with respect to the sensor due to the shake of the imaging apparatus, and wherein the second scheme is a scheme for moving the element so that the position of the object image moves less than the amount of movement of the object image with respect to the sensor due to the shake of the imaging apparatus.

5. The control apparatus according to claim 1, wherein the first scheme includes moving the element excessively relative to the shake of the imaging apparatus, and moving the sensor to cancel excessive movement of the element, and wherein the second scheme includes moving the element and the sensor so that an amount of movement of the object image with respect to the sensor due to movement of the element and the amount of movement of the object image with respect to the sensor due to movement of the sensor are both smaller than the amount of movement of the object image with respect to the sensor due to the shake of the imaging apparatus.

6. The control apparatus according to claim 1, wherein the control unit is configured to, in a case where the amount of shake is a first amount of shake, control the first and second correction units using the first scheme, and in a case where the amount of shake is a second amount of shake greater than the first amount of shake, control the first and second correction units using the second scheme.

7. The control apparatus according to claim 1, wherein the strength of the blur correction is changed by changing an upper limit value of a blur correction amount by the third correction unit, and wherein the upper limit value of the blur correction amount by the third correction unit in a case where the first correction strength is set is less than that of the blur correction amount by the third correction unit in a case where the second correction strength is set.

8. The control apparatus according to claim 1, wherein the third correction unit is configured to perform blur correction of a translational component, blur correction of a rotational component, and blur correction of the tilt component.

9. The control apparatus according to claim 1, wherein the first correction strength is zero, and wherein in a case where the first and second correction units are controlled using the first scheme, the third correction unit does not correct the tilt component of the blur.

10. The control apparatus according to claim 1, wherein the determination unit is configured to determine a gain of the blur correction by the third correction unit as the strength of the blur correction, and wherein the calculation unit is configured to calculate the correction amount using the gain.

11. The control apparatus according to claim 1, wherein the control unit is configured to control the first and second correction units using the plurality of schemes by outputting at least one of information about a correction ratio between the first and second correction units, a correction amount of the first correction unit, and a correction amount of the second correction unit to the first and second correction units.

12. The control apparatus according to claim 11, wherein the information about the correction ratio includes at least either information indicating a correction ratio of the first correction unit determined based on the amount of shake of the imaging apparatus detected or information indicating a correction ratio of the second correction unit determined based on the amount of shake.

13. The control apparatus according to claim 11, wherein the information about the correction ratio includes at least either information indicating a relationship between the amount of shake of the imaging apparatus and a correction ratio of the first correction unit or information indicating a relationship between the amount of shake and a correction ratio of the second correction unit.

14. The control apparatus according to claim 11, wherein the information about the correction ratio is information about a correction ratio between the first, second, and third correction units.

15. An imaging apparatus comprising:

the control apparatus according to claim 1;

the sensor; and the second correction unit, wherein the determination unit is configured to determine whether a lens apparatus mounted supports a coordination scheme where the first scheme and the second scheme are switched based on the amount of shake, and determine the strength of the blur correction based on a result of this determination.

16. The imaging apparatus according to claim 15, wherein the determination unit is configured to, in a case where the lens apparatus mounted supports the coordination scheme, determine the strength of the blur correction based on the amount of shake of the imaging apparatus.

17. The imaging apparatus according to claim 15, wherein the determination unit is configured to, in a case where the lens apparatus mounted does not support the coordination scheme, set the strength of the blur correction to a constant value regardless of the amount of shake of the imaging apparatus.

18. A control method for controlling blur correction by a first correction unit configured to change a direction of an axis of a system by moving an element included in the system, a second correction unit configured to move a sensor in a direction intersecting the axis, and a third correction unit configured to correct, by processing, a tilt component of blur occurring from shake of an imaging apparatus in an image generated by processing a signal output from the sensor, the sensor being configured to capture an object image formed by light transmitted through the system, the control method comprising:

determining a strength of the blur correction of the tilt component by the third correction unit;

calculating a correction amount of the third correction unit based on the determined strength of the blur correction and an amount of shake of the imaging apparatus; and controlling the first correction unit, the second correction unit, and the third correction unit using a plurality of schemes including at least a first scheme and a second scheme, wherein in a case where the first and second correction units are controlled using the first scheme, a first correction strength is determined as the strength of the blur correction, and in a case where the first and second correction units are controlled using the second scheme, a second correction strength higher than the first correction strength is determined as the strength of the blur correction, and wherein the third correction unit is configured to correct blur by geometrically deforming the image using projective transformation.

* * * * *